United States Patent [19]

Kida et al.

[11] Patent Number: 5,027,162
[45] Date of Patent: Jun. 25, 1991

[54] AUTOMATIC DOCUMENT CONVEYING DEVICE

[75] Inventors: Yasuhiko Kida, Hirakata; Yoichiro Irie, Suita; Yoshiyuki Takeda, Osaka; Tsuyoshi Nagao, Osaka, all of Japan

[73] Assignee: Mita Industrial Co., Ltd., Osaka, Japan

[21] Appl. No.: 557,703

[22] Filed: Jul. 25, 1990

[30] Foreign Application Priority Data

Jul. 27, 1989 [JP] Japan ................. 1-192544

[51] Int. Cl.⁵ ............................ G03G 21/00
[52] U.S. Cl. ................... 355/320; 271/111; 271/291; 355/318
[58] Field of Search ............ 355/320, 318, 321, 309, 355/308; 271/111, 291

[56] References Cited

U.S. PATENT DOCUMENTS

| | | | |
|---|---|---|---|
| 4,184,671 | 1/1980 | Sasamori | 355/320 X |
| 4,310,153 | 1/1982 | Kikuchi | 271/111 X |
| 4,769,674 | 9/1988 | Kitajima et al. | 355/318 X |
| 4,811,049 | 3/1989 | Honjo et al. | 355/320 |
| 4,819,023 | 4/1989 | Kitawara | 355/318 |
| 4,922,306 | 5/1990 | Araki et al. | 355/318 X |
| 4,923,190 | 5/1990 | Hirose | 271/291 X |
| 4,954,847 | 9/1990 | Murata et al. | 355/318 |

Primary Examiner—A. T. Grimley
Assistant Examiner—Sandra L. Hoffman
Attorney, Agent, or Firm—Antonelli, Terry, Stout & Kraus

[57] ABSTRACT

An automatic document conveying device to be applied to an image processor with a transparent plate on which to place document to be processed being disposed on the upper surface of a housing. The automatic document conveying device comprises a document table, a document introduction passage extending from the document table to one end edge of the transparent plate, a first document receiving tray, a second document receiving tray and a document delivery passage. The document delivery passage includes a common passage extending from the other end edge of the transparent plate, a first branched passage extending from the downstream end of the common passage to the first document receiving tray, and a second branched passage extending from the downstream end of the common passage to the second document receiving tray. The automatic document conveying device further includes a document sending means for delivering a plurality of documents on the document table piece by piece to the document introduction passage, a document introduction means for introducing the document sent out to the document introduction passage onto the document plate, a document conveying means for conveying the document along the transparent plate, and a document discharging means for discharging the document delivered to the common passage of the document delivery passage by the document conveying means through the common passage, the first branched passage of the second branched passage in the document delivery passage.

16 Claims, 9 Drawing Sheets

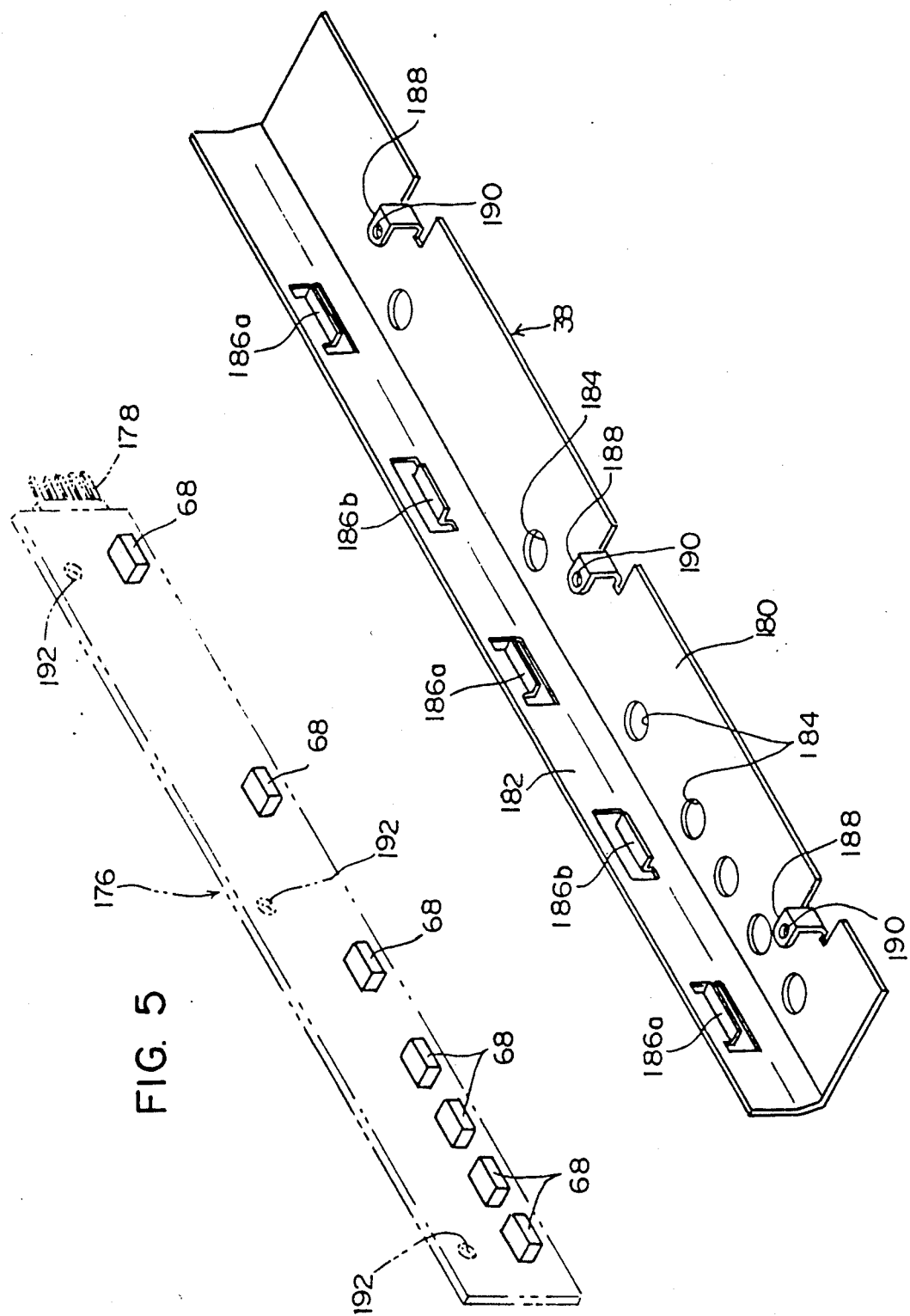

AUTOMATIC DOCUMENT CONVEYING DEVICE

FIELD OF THE INVENTION

The present invention relates to an automatic document conveying device adapted to an image processing machine such as an electrostatic copying machine or an image reader.

DESCRIPTION OF THE PRIOR ART

It is now widely accepted practice to provide image processing machines such as electrostatic copying machines and image readers with an automatic document conveying device in order to automatically handle documents in the operations for copying images or reading images. Prior literatures that disclose automatic document conveying devices can be represented by Japanese Patent Laid-Open Publications Nos. 91747/1978 and 118551/1985 and Japanese Utility Model Laid-Open Publication No. 49348/1986.

The image processing machine such as the electrostatic copying machine or the image reader is equipped with a housing on which a transparent plate is disposed to place thereon documents that are to be processed. On one end edge of the transparent plate is mounted a document placing position restricting member against which the one end of the document is usually caused to be abut. The automatic document conveying device is comprised of a document table, a document introducing passage that extends from the document table to the one end edge of the transparent plate, a document receiving tray, and a document delivery passage that extends from the other end edge of the transparent plate to the document receiving tray. In the automatic document conveying device are further disposed document sending means that sends plural pieces of documents placed on the document table onto the document introduction passage piece by piece, document introducing means that introduces onto the transparent plate the document sent onto the document introduction passage, document conveying means for conveying the document along the transparent plate, and document delivery means that discharges the document onto the document receiving tray through the document conveying passage, the document being conveyed onto the document delivery passage by the document conveying means.

Two document receiving trays are disposed in many cases, i.e., a first document receiving tray and a second document receiving tray. In these cases, the document delivery passage includes a common passage that extends from the other end edge of the transparent plate, a first branched passage that extends from the down stream end of the common passage to the first document receiving tray, and a second branched passage that extends from the downstream end of the common passage to the second document receiving tray. There is further provided branched passage switching means which is selectively positioned at a first branching position at which the common passage in the document delivery passage is communicated with the first branched passage and at a second branching position at which the common passgae is communicated with the second branched passage.

There is further disposed in many cases a re-introduction passage that is branched from the document delivery passage (usually branched from the first branched passage) and extends up to the other end edge of the transparent plate. In this case, provision is made of discharge re-introducing switching means which is selectively positioned to a discharge position at which the document is conveyed through the document delivery passage and is discharged onto the document receiving tray and to a re-introduction position at which the document is introduced onto the re-introduction passage from the document delivery passage and is introduced again onto the transparent plate.

The automatic document conveying device is usually provided with a movable frame member that is mounted to move between a closed position where the transparent plate is concealed and an open position where the transparent plate is exposed to view. The above-mentioned document conveying means is of the rotating-type that is mounted on the movable frame member. The document conveying means is capable of selectively executing the normal conveying drive for conveying the document from one end edge of the transparent plate to the other end edge thereof and the reversely conveying drive for conveying the document from the said other end edge of the transparent plate to the said one end edge thereof. When the re-introduction passage is disposed, the document is selectively positioned on the transparent plate in two ways; i.e., normal document positioning method and reversal document positioning method. In the normal document positioning method, the document introduced onto the transparent plate from the document table through the document introduction passage is conveyed by the normal conveying drive of the document conveying means until the trailing end of the document reaches a position isolated slightly downstream of the document placing position restricting member by normal rotation. The document is then reversely conveyed by reverse rotation of the document conveying means, so that the trailing end of the document is caused to abut against the document placing position restricting member. In the reversal document positioning method, the document is delivered to the document delivery passage from the transparent plate owing to the normal conveying drive of the document conveying means, and is then introduced to the re-introduction passage from the document delivery passage. Thus, the document is re-introduced onto the transparent plate while reversing the surface of the document, and is then reversely conveyed by the reversal conveying drive of the document conveying means, so that the leading end of the document is caused to abut against the document placing position restricting member.

A plurality of document detectors are arranged along the document introduction passage that extends from the document table to one end edge of the transparent plate to detect the document, i.e., to check the size and the like of the document that passes therethrough.

The conventional automatic document conveying devices involve the following problems that must be solved.

First, in processing the document by the automatic document conveying device, the document placed by hand on the transparent plate may not often be removed but may be left to stay on the transparent plate. In such a case, the unwanted document that is left must be discharged from the transparent plate prior to introducing a required document onto the transparent plate from the document table. In the conventional automatic document conveying device, however, the required document that is introduced onto the transparent plate and is placed in a required position is then discharged from the transparent plate onto the document receiving tray together with the unwanted document that is delivered from the transparent plate prior to delivery of the above required document, permitting the unwanted document to be mixed in the required documents.

Second, middle- to high-grade electrostatic copying machines have been in many cases so designed as to selectively execute the one surface-one surface copying mode in which a copy can be obtained having image on one surface from the document that has image on one surface thereof, the both surface-both surface copying mode in which a copy can be obtained having image on both surfaces from the document that has image on both surfaces thereof, and the both surface-one surface copying mode in which copies having image on one surface are formed from the document that has image on both surfaces thereof (therefore, the number of pieces of copies is twice as great as the number of pieces of documents). In such a case, it is desired to selectively execute the document conveying modes of the three-way system to meet the copying modes of the above-mentioned three-way system. In practice, however, such a demand has not been satisfied by the conventional automatic document conveying devices.

Third, in either the aforementioned normal document positioning method or the reversal document positioning method, it is important to stop the document precisely enough to properly position the document as required at a moment when the trailing end or the leading end of the document is caused to abut against the document placing position restricting member. If the document is stopped too early, the trailing end or the leading end of the document is not caused to abut against the document placing position restricting member and is stopped slightly in front of it. If the document is stopped too late, on the other hand, the document continues to move even after the trailing end or the leading end of the document is caused to abut against the document placing position restricting member, resulting in the development of wrinkles in the document. According to the conventional automatic document conveying devices, however, it was impossible or quite difficult to stop with sufficient precision the document at a required moment in at least either the normal document positioning method or the reversal document positioning method.

Fourth, in the conventional automatic document conveying devices in which a plurality of document detectors are arranged at required portions of the document introduction passage, relatively complex and cumbersome operations are required, causing the manufacturing cost to increase.

SUMMARY OF THE INVENTION

A first object of the present invention is to provide an improved automatic document conveying device which is capable of reliably preventing the unwanted document remaining on the transparent plate from mixing into the required documents.

A second object of the present invention is to provide an improved automatic document conveying device which is capable of selectively executing the three document conveying modes, i.e., simple mode, reversing mode and double reversing mode that correspond to the one surface-one surface copying mode, both surface-both surface copying mode and both surface-one surface copying mode in the electrostatic copying machine.

A third object of the present invention is to provide an improved automatic document conveying device which is capable of bringing the document into rest with sufficient precision at a determined moment at which the trailing end or the leading end of the document is caused to abut against the document placing position restricting member in either the normal document positioning method or the reversal document positioning method.

A fourth object of the present invention is to provide an improved automatic document conveying device in which a plurality of document detectors are mounted in a very simplified manner.

The other objects of the present invention will become obvious from the following description of a preferred embodiment of the automatic document conveying device constituted according to the present invention, referring to the accompanying drawings.

The gist of the present invention for achieving the above first object is concerned with the automatic document conveying device comprising a first document receiving tray and a second document receiving tray, wherein the operation is so controlled that the unwanted document remaining on the transparent plate is discharged onto the second document receiving tray when a first document discharging method is carried out to discharge the documents onto the first document receiving tray, and that the unwanted document remaining on the transparent plate is discharged onto the first document receiving tray when a second document discharging method is carried out to discharge the documents onto the second document receiving tray.

The gist of the present invention for achieving the above second object is to so control the operation as to selectively execute the simple mode, reversing mode and double reversing mode. In the simple mode, the document on the document table is introduced onto the transparent plate via the document introduction passage, placed at a required position on the transparent plate, moved through the common passage in the document delivery passage and the first branched passage, and is discharged onto the first document receiving tray while reversing front surface of the document back. In the reversing mode, the document on the document table is introduced onto the transparent plate via the document introduction passage, placed at a required position on the transparent plate, caused to enter into the first branched passage from the common passage in the document delivery passage, introduced onto the re-introduction passage so as to be re-introduced onto the transparent plate, placed again at a required position on the transparent plate while reversing the front surface of the document back, the document on the transparent plate is then moved through the common passage in the document delivery passage and the second branched passage, and is discharged onto the second document receiving tray without reversing the document. In the double reversing mode, the document conveyed onto the transparent plate from the document table through the document introduction passage is caused to enter into the first branched passage from the common passage in the document delivery passage, introduced onto the re-introduction passage so as to be re-introduced onto the transparent plate, placed at a required position on the transparent plate while reversing the front surface of the document back, caused again to enter into the first branched passage from the common passage in the document delivery passage, introduced into the re-introduction passage so as to be re-introduced onto the transparent plate, placed again at a required position on the transparent plate while reversing the document again, and the document on the transparent plate is moved through the common passage in the document delivery passage and the first branched passage and is discharged onto the first document receiving tray while reversing the document.

According to the gist of the present invention for achieving the above third object, the brake is applied in a relatively small degree to the document conveying means after the reversely conveying drive of the document conveying means is stopped in the normal document positioning method since the reversely conveying drive of the document conveying means is effected for such a very short period of time that the reversely conveying speed does not reach a rated speed. On the other hand, in the reverse document positioning method the brake is applied in a relatively large amount to the document conveying means after the reversely conveying drive of the document conveying means is stopped since the reversely conveying speed of the document conveying means reaches the rated speed. When a driving source of the document conveying means consists of a reversible DC electric motor, the brake can be applied in a relatively small amount to the document conveying means by grounding the two connection terminals of the motor. When the two connection terminals of the motor are grounded and, then, a voltage for effecting normal rotation is applied to the motor, and thereafter, the two connection terminals of the motor are grounded, the brake of a relatively large amount can be applied to the document conveying means.

According to the gist of the present invention for achieving the above fourth object, a plurality of document detectors are mounted on a common circuit board, an upper restricting plate or a lower restricting plate for restricting the document introduction passage is provided with a supporting projecting piece for supporting one surface of one end edge of the circuit board and with a screwed projecting piece which is screwed into the other end edge of the circuit board, and the circuit board is mounted on the upper restricting plate or on the lower restricting plate by utilizing the supporting projecting piece and the screwed projecting piece.

BRIEF DESCRIPTION OF THE DRAWINGS

FIG. 5 is a perspective view illustrating, in a disassembled manner, the method of mounting the document detectors on the automatic document conveying device shown in FIG. 1;

DETAILED DESCRIPTION OF THE PREFERRED EMBODIMENT

A preferred embodiment of the automatic document conveying device incorporated in an electrostatic copying machine and constituted according to the present invention will now be described in detail with reference to the accompanying drawings.

Outline of the Whole Constitution

Figure 1:
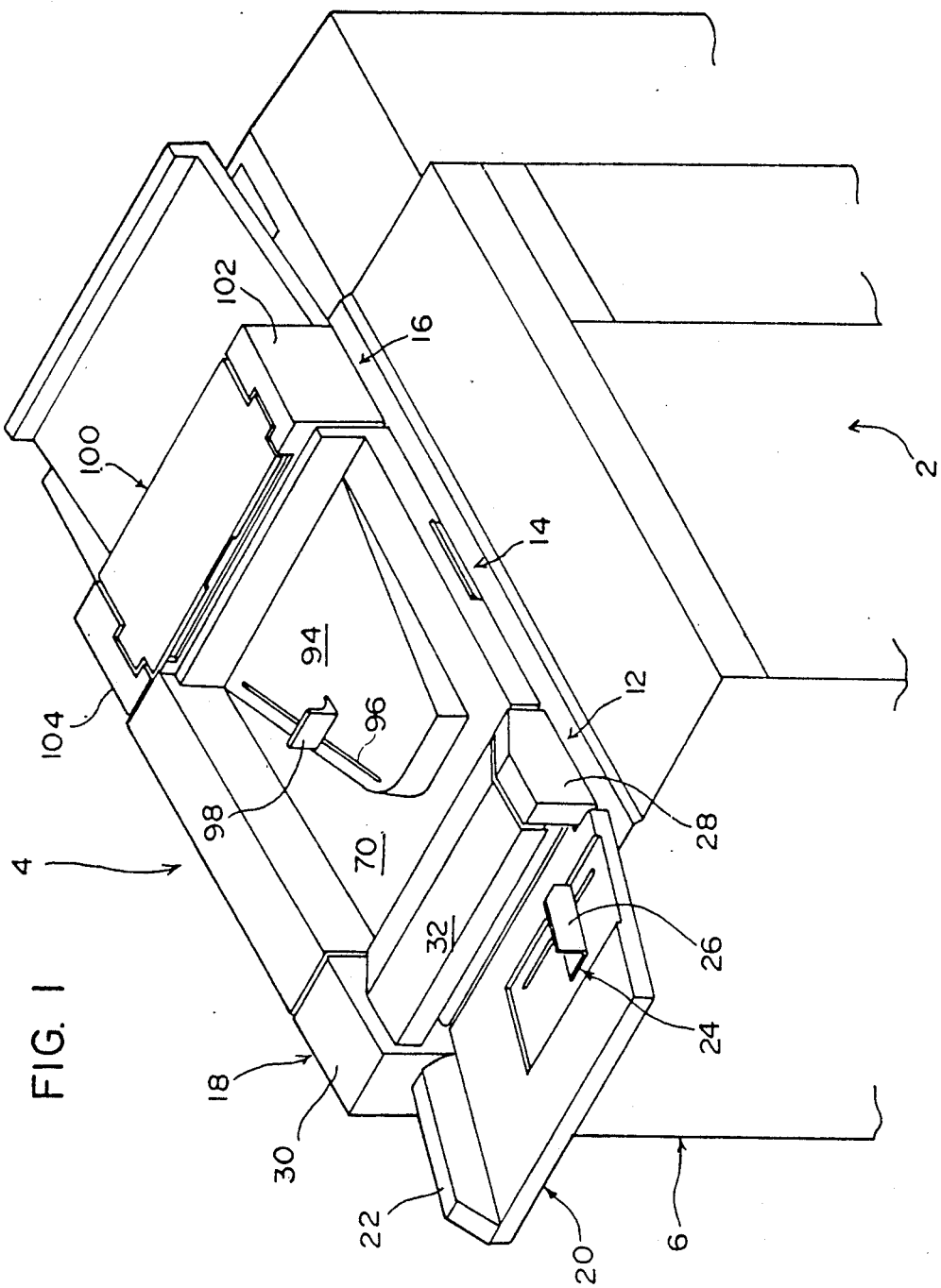
FIG. 1 is a perspective view showing an embodiment of the automatic document conveying device constituted according to the present invention together with a portion of an electrostatic copying machine in which it is incorporated.
Figure 2:
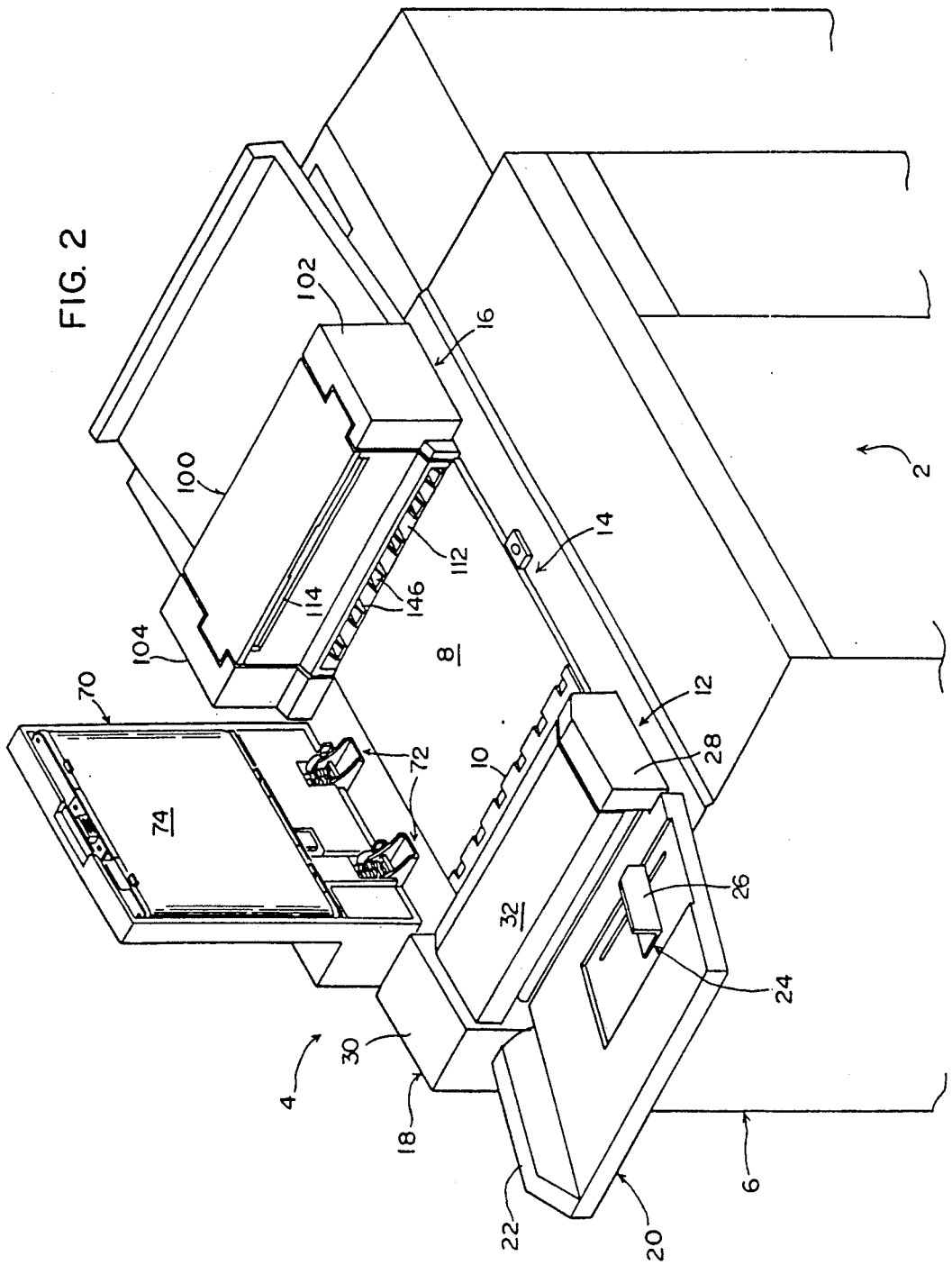
FIG. 2 is a perspective view similar to FIG. 1 showing the condition where the opening-closing frame member of the automatic document conveying device is opened.
Figure 3:
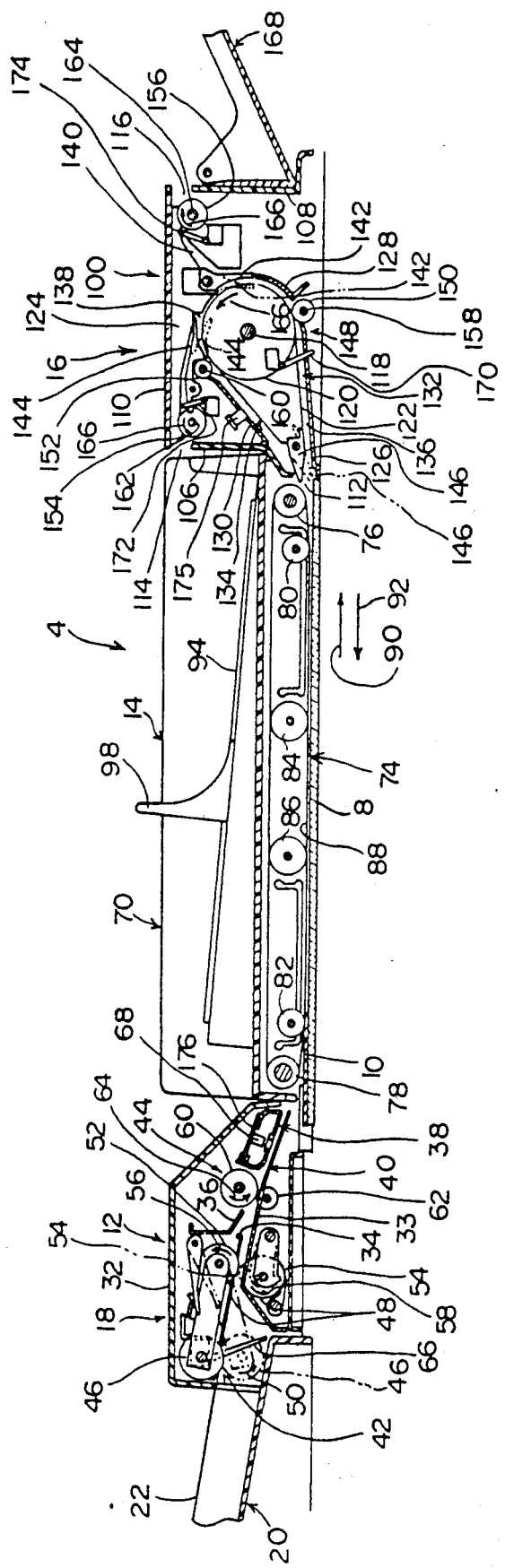
FIG. 3 is a section view showing the automatic document conveying device of FIG. 1 together with a portion of the electrostatic copying machine in which it is incorporated.

FIGS. 1, 2 and 3 illustrate an electrostatic copying machine 2 and an automatic document conveying device that is generally designated at 4 and that is incorporated in the electrostatic copying machine 2. The electrostatic copying machine 2 which is widely known per se is equipped with a nearly parallelpipedal housing 6 which has a rectangular transparent plate 8 (FIGS. 2 and 3) made of a glass arranged in the upper surface at the central portion thereof. A document placing position restricting member 10 is arranged at one end edge (left end edge in FIG. 3) of the transparent plate 8, and extends in a direction perpendicular to the surface of the paper in FIG. 3 along the one end edge of the transparent plate 8. Though not diagramed, a variety of constitutional elements inclusive of a rotary drum having an electrostatic photosensitive layer on the surface are arranged in the housing 6 of the electrostatic copying machine 2. As is widely known, a document to be copied is usually placed on the transparent plate 8 with its surface to be copied being faced downwards and with its one edge in contact with the inner edge (right end edge in FIG. 3) of the document placing position restricitng member 10. The lower surface of the document placed on the transparent plate 8 is optically scanned, an electrostatic latent image is formed on the rotary drum through a latent electrostatic image forming step that includes the document scanning light projected onto the rotary drum, the electrostatic latent image is developed to a toner image which is then transferred onto a copying sheet that consists of a common paper, the thus transferred toner image is fixed onto the copying sheet, whereby a copy is obtained.

The diagramed automatic document conveying device 4 constituted according to the present invention is made up of a document introduction unit 12, a central main unit 14, and a document delivery and re-introduction passage 16.

The document introduction unit 12 in the automatic document conveying device 4 is disposed on its upstream side (left side in FIG. 3) being juxtaposed to the one end edge of the transparent plate 8. The document introduction unit 12 includes a frame member 18 mounted on the upper surface of the housing 6 of the electrostatic copying machine 2 and a document table 20 that extends to the upstream side from the frame member 18. As clearly shown in FIG. 3, the document table 20 extends being inclined slightly upwardly toward the upstream side (toward the left in FIG. 3). An upstanding stationary document restricting wall 22 is disposed at the rear end edge of the document table 20 on which a movable document restricting member 24 is mounted movably to and fro. This member 24 may be of any form known per se. The movable document restricting member 24 has an upstanding wall 26, and the document placed on the document table 20 is positioned between the stationary document restricting wall 22 and the upstanding wall 26 of the movable document restricing member 24. The frame member 18 includes a front supporting member 28, a rear supporting member 30, and a cover member 32 disposed between the support members 28 and 30. As clearly shown in FIG. 3, an undeside restricting member 33 and three upside restricting member 34, 36 and 38 are arranged in space between the front supporting member 28 and the rear supporting member 30 under the cover member 32. A document introduction passage 40 is defined between the underside restricing member 33 and the upside restricting members 34, 36 and 38. If further described with reference to FIG. 3, there are disposed, between the front supporting member 28 and the rear supporting member 30, document sending means 42 for sending a plurality of documents placed on the document table 20 piece by piece onto the document introduction passage 40 and document introduction means 44 that introduces onto the transparent plate 8 the document that is sent onto the document introduction passage 40. The document sending means 42 includes a document sending roller 46 and a document separation roller pair 48. The document sending roller 46 is selectively descended as indicated by a two-dot chain line from the non-acting position that is indicated by a solid line, brought into contact with the upper surface at the downstream end of the first document among a plurality of documents placed on the document table 20, and is rotated in a direction indicated by arrow 50, so that the document placed on the document table 20 is forwarded toward the document introduction passage 40. The document separating roller pair 48 is constituted by a feed roller 52 and a reversal roller 54 which is selectively positioned to the non-acting position indicated by a solid line and to the acting position indicated by a two-dot chain line. When located at the non-acting position, the reversal roller 54 is positioned under the feed roller 52 maintaining a distance therefrom. When located at the acting position, the reversal roller 54 is brought into contact with the feed roller 52 to act in connection therewith. The feed roller 52 is rotated in a direction indicated by arrow 56 and the reversal roller 54 is rotated in a direction indicated by arrow 58. When a plurality of documents are simultaneously sent from the document table 20 by the document sending roller 46, the document separating roller pair 48 separates the first document only from the other documents, and introduces it onto the document introduction passage 40 while preventing the introduction of other documents. The document introduction means 44 is constituted by an upper roller 60 and a lower roller 62 that act in cooperation together and that are rotated in a direction indicated by arrow 64 to introduce the document delivered onto the document introduction passage 40 onto the transparent plate 8. Between the front supporting member 28 and the rear supporting member 30, there are disposed a placed document detector 66 for detecting the document that is placed on the document table 20 and a plurality of introduced document detectors 68 for detecting the document that is introduced onto the transparent plate 8 via the document introduction passage 40. Introduction of the document as well as the size of the introduced document are detected by the plurality of the introduced document detectors 68.

Here, the document sending means 42 (document sending roller 46 and document separating roller pair 48), document introduction means 44 (upside roller 60 and underside roller 62), and the document detector 66 do not constitute any novel feature of the present invention and may, hence, be those of the forms widely known among those skilled in the art, and may, for instance, be those of the forms disclosed in the specification and drawings of Japanese Laid-Open Patent Publication No. 100939/1990 filed by the present applicant. Therefore, they are not described in detail in the specification of the present application. The document detectors 68 and, particularly, the manner of mounting them will be described later in detail.

The central main unit 14 in the automatic document conveying device 4 is equipped with an opening-closing frame member 70. The opening-closing frame member 70 is mounted on the upper surface of the housing 6 of the electrostatic copying machine 2 via a pair of mounting mechanisms 72 (FIG. 2) disposed at the back of the transparent plate 8, and can be manually opened or closed between a closed position shown in FIGS. 1 and 3 and an open position shown in FIG. 2. When the opening-closing frame member 70 is brought to the closed position, the transparent plate 8 is covered with the opening-closing frame member 70. On the other hand, when the opening-closing frame member 70 is brought to the open position, the transparent plate 8 is exposed to the view. The main unit of the opening-closing frame member 70, i.e., a portion that covers the transparent plate 8 at the closed position, assumes the box-like shape with its lower surface open. As clearly shown in FIG. 3, document conveying means 74 that conveys the document along the transparent plate 8 closing frame member 70. The document conveying means 74 is constituted by a conveyor roller mechanism that includes a driven roller 76, a follower roller 78, guide rollers 80, 82, 84 and 86 disposed in space in a direction in which the document is conveyed (right-and-left direction in FIG. 3), and an endless belt 88 wrapped around these rollers. As will be described later in further detail, the document conveying means 74 is selectively driven in a normally conveying direction indicated by arrow 90 and in a reversely conveying direction indicated by arrow 92 by a rotating drive source which may be a reversible DC electric motor. The upper surface of the box-like main unit of the opening-closign frame member 70 constitutes a first document receiving tray 94 that receives the document discharged through the document delivery and re-introduction passage 16 which will be described later. The first document receiving tray 94 is provided with a document front edge restricting member 98 that extends being forwardly tilted toward the upstream and that is movable along a slit 96. The document discharged onto the first document receiving tray 94 is caused at its front edge to abut against the upstanding wall of the document front edge restricting member 98, and is thus caused to rest at a required position on the first document receiving tray 94.

The central main unit 14 of the automatic document conveying device 4 is not the one which constitutes novel feature of the present invention and is not, therefore, described in detail in this specification.

The document delivery and re-introduction passage 16 in the automatic document conveying device 4 is disposed on the downstream side (right side in FIG. 3) of the transparent plate 8 being juxtaposed to the other end edge (right end edge in FIG. 3) thereof. The document delivery and re-introduction passage 16 includes a box-like frame member 100 with its lower surface open. The frame member 100 is constituted by front and rear members 102 and 104 disposed in a spaced-apart relationship in the to-and-fro direction (direction perpendicular to the surface of the paper in FIG. 3), side walls 106 and 108 disposed in a spaced-apart relationship in the right-left direction in FIG. 3, and an upper surface wall 110. At the lower end of the side wall 106 is formed a passage opening 112 (FIGS. 2 and 3) through which the document will pass. Moreover, a first discharge opening 114 (FIGS. 2 and 3) is formed at the upper end of the side wall 106 and a second discharge opening 116 (FIG. 3) is formed at the upper end of the side wall 108. If description is continued with reference chiefly to FIG. 3, a horizontally extending rotating shaft 118 is rotatably mounted on the central part of the frame member 100, and a plurality of delivery rollers 120 are secured to the rotating shaft 118 in an axially spaced-apart relationship. In relation to the delivery rollers 120, there are disposed a central restricting member 122, an outside restricting member 124, and outside restricting plates 126, 128 and 130 in the frame member 100 thereby to form a document delivery passage 132 and a document re-introduction passage 134. The document delivery passage 132 extending from the passage opening 112 includes a common passage 136 as well as a first branched passage 138 and a second branched passage 140. The common passage 136 extends from the passage opening 112, the first branched passage 138 extends from a branch point (downstream end of common passage 136) to the first discharge opening 114, and the second branched passage 140 extends from the above branching point to the second discharge opening 116. The re-introduction passage 134 is branched from the first branched passage 138 and extends to the passage opening 112. Branched passage switching means 142 is disposed at the branching point of the first and second branched passages 138 and 140, i.e., disposed at the downstream end of the common passage 136. The branched passage switching means 142 is selectively positioned at a first branched position indicated by a solid line and at a second branched position indicated by a two-dot chain line. When the branched passage switching means 142 is positioned at the first branched position, the common passage 136 is communicated with the first branched passage 138. When the branched passage switching means 142 is positioned at the second branched position, the common passage 136 is communicated with the second branched passage 140. Discharge re-introduction switching means 144 is disposed at the upstream end of the re-introduction passage 134 which is branched from the first branched passage 138. The discharge re-introduction switching means 144 is selectively positioned at the re-introduction position indicated by a solid line and the discharge position indicated by a two-dot chain line. When the discharge re-introduction switching means 144 is positioned at the re-introduction position, the upstream portion of the first branched passage 138 is shut off from its downstream portion; i.e., the upstream portion of the first branched passage 138 is communicated with the re-introduction passage 134. When the discharge re-introduction switching means 144 is positioned at the discharge position, the upstream portion of the first branched passage 138 is communicated with its downstream portion, and the re-introduction passage 134 is shut off from the first branched passage. In the diagramed embodiment, furthermore, there is a disposed delivery re-introduction switching means 146 in relation to the passage opening 112, i.e., in relation to the upstream end of the common passage 136 and the downstream end of the re-introduction passage 134. The delivery re-introduction switching means 146 is selectively positioned to the delivery position indicated by a solid line and to the re-introduction position indicated by a two-dot chain line. As will be described later in further detail, when the document on the transparent plate 8 is to be delivered onto the common passage 136, the delivery re-introduction switching means 146 is positioned at the delivery position. When the document is to be re-introduced onto the transparent plate 8 via the re-introduction passage 134, the delivery re-introduction switching means 146 is positioned at the re-introduction position.

There is disposed a document delivery means 148 to convey the document as required through the document delivery passage 132 (common passage 136, first branched passage 138 and second branched passage 140) and the re-introduction passage 134. The document delivery means 148 includes, in addition to the delivery rollers 120, follower rollers 150 and 152 cooperating together with the delivery rollers 120, and discharge rollers 154 and 156. A plurality of follower rollers 150 are secured to the rotatably mounted and horizontally extending rotating shaft 158 so as to be corresponded to the plurality of delivery rollers 120. Similarly, a plurality of follwer rollers 152 are secured to a rotatably mounted and horizontally extending rotating shaft 160 so as to be corresponded to the plurality of delivery rollers 120. The discharge rollers 154 disposed in relation to the first branched passage 138 are secured in plural number to a horizontally extending rotating shaft 162 maintaining a spaced-apart relationship in the axial direction, and the discharge rollers 156 disposed in relation to the second branched passage 140 are secured in plural number to a horizontally extending rotating shaft 164 maintaining a spaced-apart relationship in the axial direction. The delivery rollers 120 and the discharge rollers 154 and 156 are rotated in a direction indicated by arrow 166, and the follower rollers 150 and 152 are moved in a direction indicated by arrow 166. The discharge roller 154 discharges, through the first discharge opening 144, the document that is delivered to the downstream portion of the first branched passage 138. The document discharged through the first discharge opening 114 is accommodated in the first document receiving tray 94 formed on the upper surface of the opening-closing frame member 70. The discharge roller 156 dischargs, through the second discharge opening 116, the document that is delivered onto the second branched passage 140. A second document receiving tray 168 is disposed on the downstream side of the second discharge opening 116, and the document discharged through the second discharge opening 116 is accommodated in the second document receiving tray 168. In the document delivery and re-introduction passage 16 are further disposed delivered document detecting means 170 that detects the document delivered from the transparent plate 8 to the common passage 136 of the document delivery passage 132, first discharged document detecting means 172 that detects the document discharged onto the first document receiving tray 94 via the first branched passage 138, second discharged document detecting means 174 that detects the document discharged onto the second document receiving tray 168 via the second branched passage 140, and re-introduced document detecting means 175 that detects the document re-introduced onto the transparent plate 8 via the re-introduction passage 134. These detecting means 170, 172, 174 and 175 may be constituted by using microswitches or photoelectric switches.

Manner of Mounting the Introduced Document Detectors in the Document Introduction Unit As described already with refrence to FIG. 3, a plurality of the introduced document detectors 68 are disposed in the document introduction unit 12 in a particular manner of mounting according to the present invention.

Figure 4:
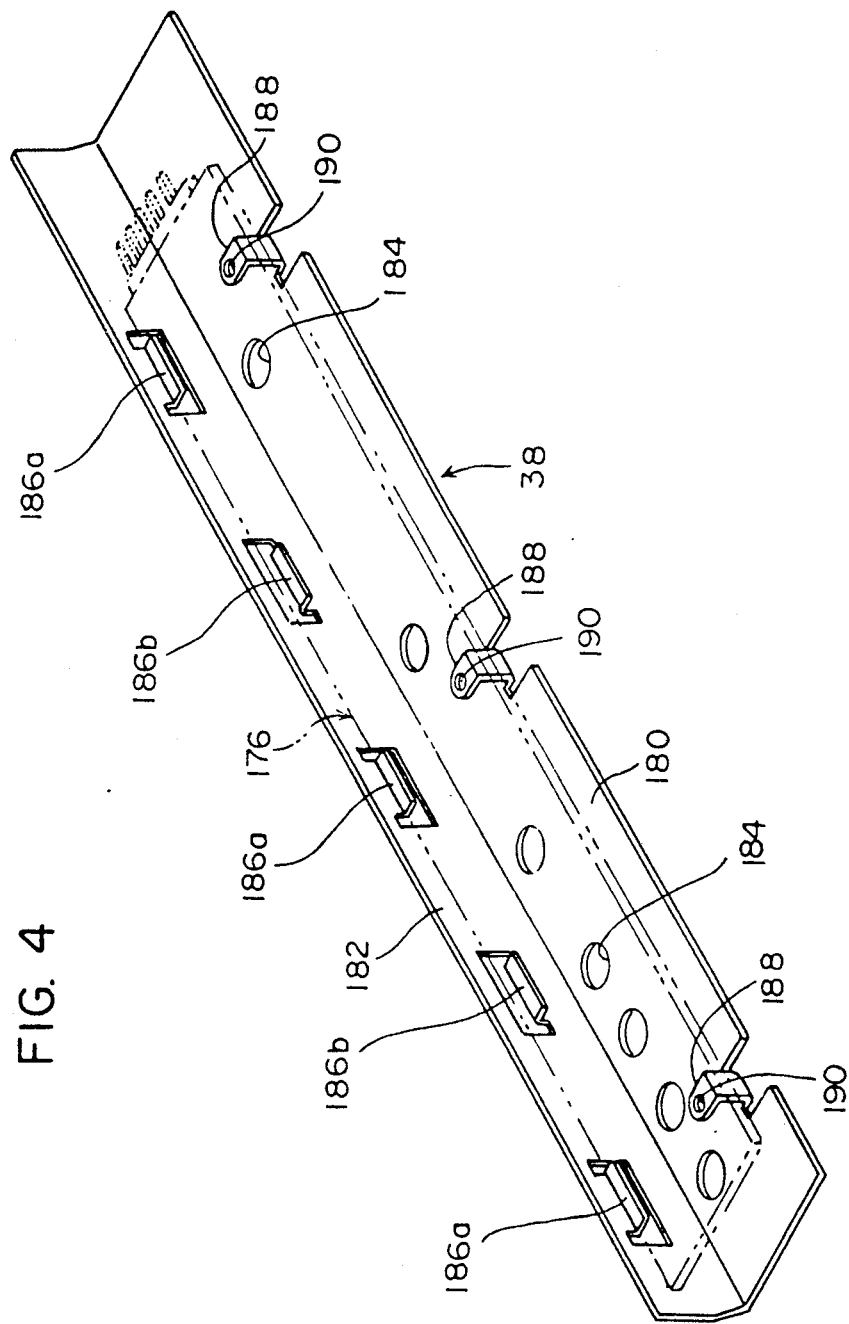
FIG. 4 is a partial perspective view illustrating the method of mounting the document detectors on the automatic document conveying device shown in FIG. 1.

If described with reference to FIG. 3 as well as FIGS. 4 and 5, the plurality of the introduced document detectors 68 are mounted at suitable positions on the lower surface of a circuit board 176. The plurality of the introduced document detectors 68 may be the well-known reflection-type photoelectric switches having a light emitting element and a light receiving element. An electric connection fitting 178 is secured to the rear end of the circuit board 176. On the circuit board 176 which is known per se are further disposed other electric elements such as resistors together with many wirings and apertures for the wirings which, however, are not diagramed in FIGS. 3 to 5 for the purpose of simplicity.

The circuit board 176 having the introduced document detectors 68 mounted thereon is mounted on the upper surface side of the upside restricting member 38 that defines the upper side of the downstream portion of document introduction passage 40 in the document introduction passage 16. The upside restricting member 38 has a main portion 180 that extends along the document introduction passage 40 and an additional portion 182 that extends upwardly from the upstream end of the main portion 180. In the main portion 180 are formed a plurality of openings 184 corresponding to the plurality of the introduced document detectors 68 mounted on the lower surface of the circuit board 176 that is mounted on the main portion 180. The introduced document detectors 68 optically detect the document introduction passage 40 through the openings 184. On the additional portion 182 of the upside restricting member 38 are formed a plurality of supporting projecting pieces, i.e., are formed upper supporting projecting pieces 186a and lower supporting projecting pieces 186b maintaining distances in the direction of width. The upper supporting projecting pieces 186a and the lower supporting projecting pieces 186b are formed by partly cutting portions of the additional portion 182 and projecting them toward the downstream. The upper supporting projecting pieces 186a and the lower supporting projecting pieces 186b are displaced relative to each other in the vertical direction, and the vertical displacement size thereof corresponds to the thickness of the circuit board 176. At the downstream end of the main portion 180 of the upside restricting member 38, on the other hand, there are formed a plurality of screwed projecting pieces 188 maintaining a distance in the direction of width. The screwed projecting pieces 188 are formed by partly cutting portions of the main portion 180, upwardly folding them and, then, projecting them toward the upstream. A screw hole 190 is formed in a supporting portion extending toward the upstream of the screwed projecting pieces 188. Holes 192 are formed at the downstream end of the circuit board 176 to correspond to the screw holes 190. When the circuit board 176 is to be mounted on the upper surface side of the upside restricting member 38, as will be easily understood from the comparison of FIG. 4 with FIG. 5, the upstream end of the circuit board 176 is inserted between the upper supporting projecting pieces 186a and the lower supporting projecting pieces 186b formed in the additional portion 182, and is held thereby. In this case, the upstream end of the circuit board 176 is brought in contact with the additional portion 182 to hold the circuit board 176 at a predetermined position with respect to the upside restricting member 38 in the direction of conveying the document. The downstream end of the circuit board 176 is positioned on the screwed projecting pieces 188, and binding screws (not shown) are applied to the screw holes 190 of hte screwed projecting pieces 188 through holes 192 of the circuit board 176. Thus, the circuit board 176 is mounted at a required position on the upper surface side of the upside restricting member 38, so that the plurality of the introduced document detectors 68 are mounted at required positions.

According to the aforementioned manner of mounting the delivered document detectors 68 of the present invention, the circuit board 176 can be mounted and, hence, the delivered document detectors 68 fitted thereto can be mounted at required positions very easily and quickly. Furthermore, constitution related to mounting the delivered document detectors 68 is very simple and is cheaply realized.

The present invention is in no way limited to the manner of mounting that is diagramed but permits various changes and modifications to be made to the manner of mounting without departing from the scope of the present invention. For instance, the screwed projecting pieces 188 formed in the main portion 180 of the upside restricting member 38 may be projected upwardly and then toward the downstream, instead of projecting them upwardly and then toward the upstream. Furthermore, when there exists sufficiently wide mounting space under the document introduction passage 40, the circuit board 176 may be mounted on the lower surface side of the underside restricting member 33 instead of being mounted on the upper surface side of the upside restricting member 38.

Operation Control

If described with reference to FIG. 3 and FIG. 6, the operation of the aforementioned automatic document conveying device 4 is controlled by control means 196 which can be constituted by a microprocessor.

The control means 196 is served with signals from various detecting means or detectors that are mentioned above already, i.e., served with signals from the placed document detector 66 and the introduced document detectors 68 disposed in the document introduction unit and 12, from the delivered document detecting means 170, first discharged document detecting means 174 and second discharged document detecting means 175 that are disposed in the document delivery and re-introduction passage 16. In the central main unit 14 of the automatic document conveying device 4 is further disposed a pulse generator 198 (FIG. 6) which is known per se and which generates pulses in response to the operation of the document conveying means 74 constituted by the conveyer roller mechanism (therefore, the number of pulses generated varies depending on the document conveying rate of the document conveying means 74). The pulses generated by the above pulse generator 198 are also supplied to the control means 196. Moreover, control means 200 (which can be constituted by microprocessors) provided in the electrostatic copying machine 2 equipped with the automatic document conveying device 4 feeds plural kinds of required signals (which will be described later) to the control means 196.

Figure 6:
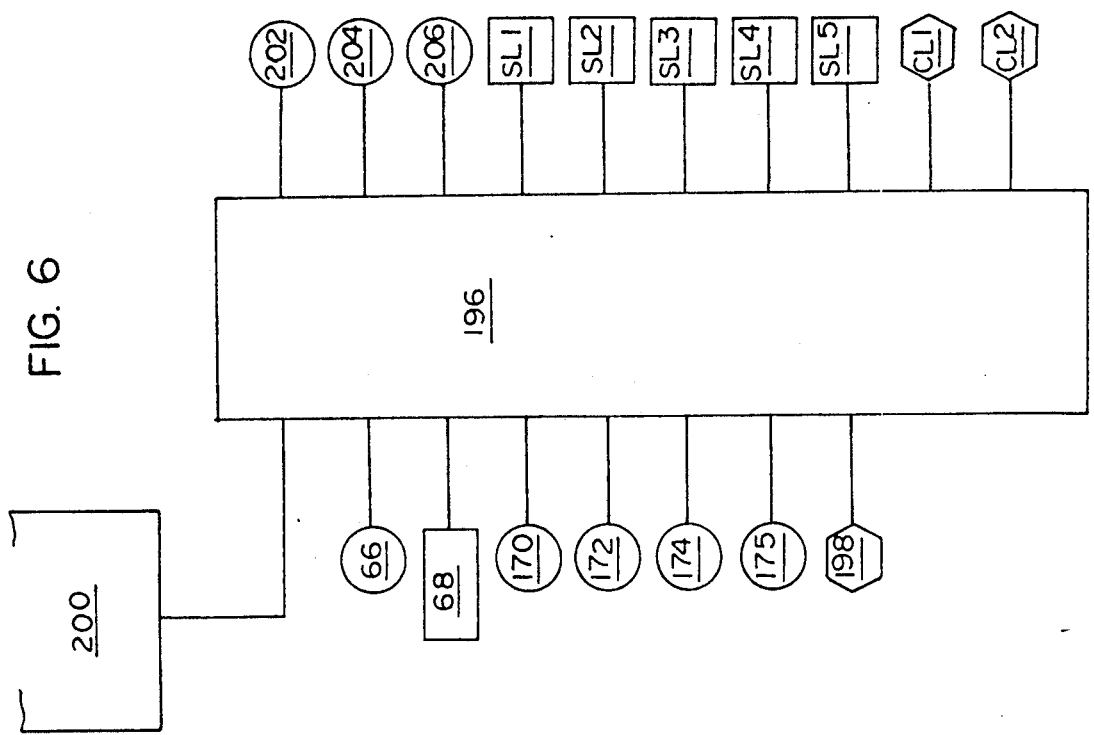
FIG. 6 is a simplified view showing related control elements arranged in the automatic document conveying device of FIG. 1.

As shown in FIG. 6, the control means 196 controls the energization and de-energization of an introduction drive source 202 that drives a variety of driven elements disposed in the document introduction unit 12, a conveying drive source 204 that drives a driven element, i.e., document conveying means 74 disposed in the central main unit 14, and a delivery and re-introduction drive source 206 that drives various driven elements disposed in the document delivery and re-introduction passage 16. The drive sources 202, 204 and 206 can be constituted by an electric motor, respectively.

Figure 7:
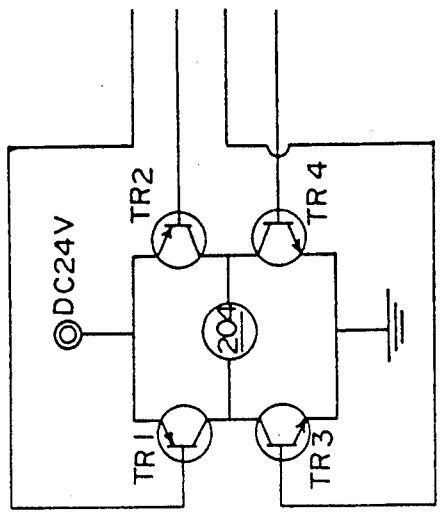
FIG. 7 is a simplified view showing a conveying drive source provided in the automatic document conveying device of FIG. 1.

In one aspect of the present invention, the conveying drive source 204 is constituted by a reversible DC electric motor. As diagramed in FIG. 7, the electric motor which constitutes the conveying drive source 204 is connected to a DC voltage source (DC 24 volts) via four switching elements IR1, TR2, TR3 and TR4 which may be transistors. When TR1 and TR4 are turned on (TR2 and TR3 are turned off), the conveying drive source 204 produces energy for effecting normal rotation. When TR2 and TR3 are turned on (TR1 and TR4 are turned off), the conveying drive source 204 produces reversing energy. When the two connection terminals of the conveying drive source 204 are grounded with TR3 and TR4 maintained turned on (TR1 and TR2 turned off), the conveying drive source 204 produces braking energy, i.e., produces braking action. When TR1, TR2, TR3 and TR4 are all turned off, the conveying drive source 204 is placed under free condition.

If further described with reference to FIGS. 3 and 6, the control means 196 further controls the energization and de-energization of a delivery solenoid SL1, a separation solenoid SL2, a delivery and separation clutch CL1, an introduction clutch CL2, a delivery re-introduction switching solenoid SL3, a branched passage switching solenoid SL4, and a discharge re-introduction switching solenoid SL5. When the delivery solenoid SL1 is energized, the document delivery roller 46 is lowered as indicated by a two-dot chain line from the non-acting position that is indicated by a solid line. When the separation solenoid SL2 is energized, the reversal roller 54 in the document separation roller pair 48 is moved to the acting position indicated by a two-dot chain line from the non-acting position indicated by a solid line. When the delivery and separation clutch CL1 is energized under the condition where the introduction drive source 202 is energized, the document delivery roller 46 and the document separation roller pair 48 are driven. When the introduction clutch CL2 is energized under the condition where the introduction drive source 202 is energized, the document introduction means 44 (upper roller 60 and lower roller 62) is driven. The document delivery means 74 (conveyer roller mechanism) in the central main unit 14 is coupled to the conveying drive source 204, and is driven normally or reversely depending upon the normal rotation or the reversal rotation of the conveying drive source 204. The driven element disposed in the document delivery and re-introduction passage 16 is coupled to the delivery and re-introduction drive source 206, and is driven when the delivery and re-introduction drive source 206 is energized. When the delivery re-introduction switching solenoid SL3 is energized, the delivery re-introduction switching means 146 is switched from the delivery position indicated by a solid line over to the re-introduction position indicated by a two-dot chain line. When the branched passage switching solenoid SL4 is energized, the branched passage switching means 142 is switched from the first branched position indicated by a solid line over to the second branched position indicated by a two-dot chain line. When the discharge re-introduction switching solenoid SL5 is energized, the discharge re-introduction switching means 144 is switched from the re-introduction position indicated by a solid line over to the discharge position indicated by a two-dot chain line.

The diagramed automatic document conveying device 4 is operated in one of the simple mode, the reversing mode, or the double reversing mode being controlled by the control means 196. Selection for the simple mode, the reversing mode, or the double reversing mode in which the automatic document conveying device 4 should be operated, is made by an operator who manually operates selection keys (not shown) arranged in the electrostatic copying machine 2 which is equipped with the automatic document conveying device 4. A signal indicating the selected mode is supplied to the control means 196 of the automatic document conveying device 4 via the control means 200

SIMPLE MODE

When the simple mode is selected, the automatic document conveying device 4 operates as described below. If explained with reference to FIGS. 3 and 8, it is now attempted to obtain copies of a plurality pieces of documents by utilizing the automatic document conveying device 4. For this purpose, the plurality of documents to be copies are placed as required on the document table 20 with their front surfaces being faced downwards. Then, the placed document detector 66 detects the documents that are placed and the automatic document conveying device 4 becomes operable. Then, when the operator operates a copying start switch disposed on the electrostatic copying machine 2, an operation start signal is fed to the control means 196 of the automatic document conveying device 4 from the control means 200 in the electrostatic copying machine 2. Then, the delivery solenoid SL1 is energized causing the document sending roller 46 to be lowered as indicated by the two-dot chain line in FIG. 3, and the separation solenoid SL2 is energized causing the reversal roller 54 in the separation roller pair 48 to move to the acting position indicated by the two-dot chain line in FIG. 3. Moreover, the introduction drive source 202 is energized (normal rotation) and the delivery and separation clutch CL1 is energized, so that the document sending roller 46 and the separation roller pair 48 are driven. Ihus, the first document is delivered onto the document introduction passage 40 out of the plurality of pieces of documents that are placed on the document table 20.

In the diagramed automatic document conveying device 4 constituted according to the present invention, when the copying start switch is manually operated as described above, the conveying drive source 204 is set in a normally rotating condition (TR1 and TR4 are turned on), the document conveying means 74 in the central main unit 14 is normally driven, the delivery and re-introduction drive source 206 is energized, and the driven elements (delivery roller 120, and discharge rollers 154, 156) disposed in the delivery and re-introduction passage 16 are driven. Therefore, when the document manually positioned on the transparent plate 8 of the electrostatic copying machine 2 is left unremoved, the document left unremoved is delivered by the document conveying means 74 from the transparent plate 8 to the document delivery passage 132, and is discharged through the document delivery passage 132. When the simple mode is carried out, furthermore, the document that is introduced onto the transparent plate 8 from the document table 20 is discharged onto the the first document receiving tray 94 from the first discharge opening 114 via the common passage 136 of document delivery passage 132 and the first branched passage 138 (i.e., the first document discharging method is carried out). When the document that is left unremoved is to be discharged through the document delivery passage 132, on the other hand, the branched passage switching solenoid SL4 is energized and the branched passage switching means 142 is switched to the second branched position indicated by the two-dot chain line in FIG. 3. Therefore, the document that is left unremoved is introduced onto the second branched passage 140 from the common passage 134 of the document delivery passage 132, and is discharged onto the second document receiving tray 168 through the second discharge opening 116. Thus, the document left unremoved is discharged onto the second document receiving tray 168 that is different from the first document receiving tray 94 on which the ordinary documents will be discharged later. Accordingly, such an inconvenience that the unremoved document is mixed into the ordinary documents is reliably avoided. When the unremoved document is delivered from the transparent plate 8 onto the common passage 134 of the document delivery passage 132, the delivered document detecting means 170 detects this fact and the presence of the unremoved document is thus recognized. The second discharged document detecting means 174 detects the unremoved document that is discharged onto the second document receiving tray 194 through the second branched passage 140. After the passage of a brief period of time which may, for example, be 25 milliseconds (during which the unremoved document is completely discharged onto the second document receiving tray 194) from a moment at which the trailing edge of the unremoved document has passed the second delivered document detecting means 174, the delivery and re-introduction drive source 206 is de-energized, the branched passage switching solenoid SL4 is de-energized, and the branched passage switching means 142 returns back to the first branched position indicated by the solid line in FIG. 3.

The document delivered from the document table 20 will be described further. The document introduced to the document introduction passage 40 from the document table 20 comes at its leading edge into contact with the document introduction means 44 (or, more precisely, nip portions of rollers 60 and 62 constituting the document introduction means 44) of under the rest condition, and is temporarily prevented from advancing. After the passage of a predetermined period of time (e.g., 375 msec) from the moment when the operation start signal is formed, the separation solenoid SL2 is de-energized and the reversal roller 54 of the separation rollr pair 48 is returned back to the non-acting position indicated by the solid line in FIG. 3. Further, the delivery and separation clutch CL1 is de-energized, and the delivery roller 46 and the separation roller pair 48 are no more driven. At the same time, the introduction clutch CL2 is energized and the document introduction means 44 is driven. Then, introduction of the document is started by the document introduction means 44, and the document which had been temporarily prevented from advancing is introduced onto the transparent plate 8 through the document introduction passage 40. At this moment, the plurality of introduced document detectors 68 detect the document, whereby introduction of the document is detected and the size of the introduced document is detected, too. The size of the introduced document is messaged from the control means 196 of the automatic document conveying device 4 to the control means 200 of the electrostatic copying machine 2, and operation of the electrostatic copying machine 2 is properly controlled depending upon the size of the introduced document. Detecting the size of the introduced document and controlling the electrostatic copying machine 2 based thereupon pertain to technology widely known among people skilled in the art, and are not described here in detail. After a brief period of time (e.g., 20 msec) from the moment at which the trailing edge of the introduced document has passed a particular detector among the plurality of introduced document detectors 68, the introduction clutch CL2 is de-energized and the document introduction means 44 is no more driven. The document which is partly introduced onto the transparent plate 8 continues to be convered by the document conveying means 74 that is under the normally rotating condition. As the introduction clutch CL2 is de-energized, the separation solenoid SL2 is energized again and the reversal roller 54 of the separation roller pair 48 is raised to the acting position indicated by the two-dot chain line in FIG. 3. Further, the delivery and separation clutch CL1 is energized, and the delivery roller 46 and the separation roller pair 48 are driven. Thus, the next document is introduced onto the document introduction passage 40 from the document table. The conveying drive source 204 disposed in the central main unit 14 is converted from the normally rotating energy creating condition (TR1 and IR4 are turned on) into the braking energy creating condition (TR3 and IR4 are turned on) at a particular moment after the above brief period of time from the moment when the trailing end of the introduced document has passed the above-mentioned particular introduced document detector 68, i.e., after, for example, 40 pulses (which correspond to about 40 mm of the document conveying length) generated from the pulse generator 198 in the central main unit 1 are counted starting from the moment at which the trailing end of the introduced document has passed the above-mentioned particular introduced document detector 68. Thus, the brake is applied to the conveying drive source 204 and, hence, to the document conveying means 74. At this moment, the trailing end of the document introduced onto the transparent plate 8 slightly passes (e.g., about 5 mm) over the document placing position restricting member 10 that is disposed at the upstream end (left end in FIG. 3) of the transparent plate 8. After a brief period of time (e.g., 25 msec) from when the conveying drive source 204 is converted into the braking energy creating condition, the conveying drive source 204 is converted into the reversely rotating energy creating condition (TR2 and TR3 are turned on) from the braking energy creating condition. Then, the document conveying means 74 is reversely rotated and the introduced document is reversely conveyed on the transparent plate 8 toward rhe upstream. After the counting of pulses generated from the pulse generator 198 is started and after, for example, eight pulses are counted from the moment at which the conveying drive source 204 was converted into the reversely rotating energy creating condition, the conveying drive source 204 is converted again into the braking energy creating condition, maintained under this braking energy creating condition for some period of time (e.g., 25 msec), and is then placed under free condition (TR1, TR2, TR3 and TR4 are all turned off). Thus, the brake of a relatively small suitable amount is applied to the conveying drive source 204 and, hence, to the document conveying means 74. Therefore, the document conveying means 74 discontinues the conveying action, the document is no more conveyed (no more conveyed by reverse rotation) by the document conveying means 74, and the introduced document is placed in position on the transparent plate 8, i.e., placed at a position where the trailing end (left end edge in FIG. 3) is caused to abut against the right end edge of the document placing position restricting member 10.

When the introduced document is placed in position on the transparent plate 8 as described above, a signal is supplied from the control means 196 of the automatic document conveying device 4 to the control means 200 of the electrostatic copying machine 2 which then executes required copying steps for the document that is introduced.

The delivery and separation clutch CL1 that is energized to deliver the second piece of document from the document table 20 is de-energized after a predetermined period of time (e.g., 375 msec) from the moment when it was energized and thus the sending roller 46 and the separation roller pair 48 are no more driven. At this moment, the introduction drive source 202 is de-energized, too. However, the separation solenoid SL2 is not de-energized at such a moment but is continued to be energized. The leading edge of second document delivered from the document table 20 is caused to abut against the document introduction means 44 that is at rest, before the delivery and separation clutch CL1 is de-energized, and thus, the second document is temporarily prevented from advancing. The trailing end of the document is still nipped by the separation roller pair 48 (the reversal roller 54 thereof is still maintained at the acting position). Therefore, part (front half) of the document that is delivered is maintained under a predetermined curved condition between the document introduction means 74 and the document separation roller pair 48.

When the copying step for the first document that is started, as described above, is finished in the electrostatic copying machine 2 (or at least when the exposure of the document is completed and, hence, the first document is ready to be delivered from the transparent plate 8), the control means 200 of the electrostatic copying machine 2 sends a document change signal to the control means 196 of the automatic document conveying device 4. Then, the separation solenoid SL2 is de-energized, and the introduction drive source 202 is energized and the introduction clutch CL2 is energized. The introduction of document is thus started by the document introduction means 44, and the second document that had been temporarily prevented from advancing is now permitted to be introduced onto the transparent plate 8 through the document introduction passage 40. Moreover, the conveying drive source 204 is set to the condition of normal rotation, the document conveying means 74 in the central main unit 14 is normally rotated, the delivery and re-introduction drive source 206 is energized, and driven elements disposed in the delivery and re-introduction passage 16 are driven. Then, the first document placed on the transparent plate 8 is delivered onto the common passage 136 of the document delivery passage 132 by the document conveying means 74. As this moment, since the branched passage switching means 142 has been held at the first branched position indicated by the solid line in FIG. 3, the first document delivered onto the common passage 136 is introduced to the first branched passage 138 from the common passage 136. At the moment when the document change signal is produced, on the other hand, the discharge re-introduction switching solenoid SL5 is also energized and the discharge re-introduction switching means 144 is switched to the discharge position indicated by the two-dot chain line in FIG. 3. Therefore, the first document introduced onto the first branched passage 138 is discharged onto the first document receiving tray 94 through the first discharge opening 114 (first document discharging method). The first document is detected by the delivered document detector 170 as it is delivered from the transparent plate 8 onto the common passage 136 of the document discharge passage 132. The first discharged document detector 172 detects the first document that is discharged through the first branched passage 138. After a brief period of time (e.g., 25 msec) from the moment when the trailing edge of the first document has passed the first discharged document detector 172, the delivery and re-introduction drive source 206 is de-energized, the discharge re-introduction switching solenoid SL5 is de-energized, and the discharge re-introduction switching means 144 is returned back to the re-introduction position indicated by the solid line in FIG. 3.

On the other hand, the second document introduced onto the transparent plate 8 by the document introduction means 44 is detected by the plurality of introduced document detectors 68, whereby the introduction and the size of the second document is detected. After a brief period of time (e.g., 25 msec) from the moment at which the trailing edge of the second document has passed a particular one detector among the plurality of the introduced document detectors 68, the introduction clutch CL2 is de-energized and the introduction drive source 202 is de-energized, too. Thus, the document introduction means 44 discontinues to be driven. Thereafter, the second document that is partly introduced onto the transparent plate 8 continues to be conveyed by the document conveying means 74 that is under the normally rotating condition. The second document is then placed in position on the transparent plate 8 just like the case of the first document. That is, the conveying drive source 204 disposed in the central main unit 14 is converted from the normally rotating energy creating condition (TR1 and TR4 are turned on) to the braking energy creating condition (TR3 and TR4 are turned on) at a particular moment after the above-mentioned brief period of time has passed from the moment of when the trailing edge of the second document had passed the above-mentioned particular one introduced document detector 68, i.e., after, for example, 20 pulses (correspond to about 10 mm of the document conveying length) generated from the pulse generator 198 in the central main unit 1 are counted starting from the moment when the trailing edge of the introduced document has passed the above particular one introduced document detector 68. Thus, the brake is applied to the conveying drive source 204 and, hence, to the document conveying means 74. At this moment, the end edge of the second document introduced onto the transparent plate 8 is slightly passing (by, for example, about 5 mm) over the document placing position restricting member 10 that is disposed at the upstream end (left end in FIG. 3) of the transparent plate 9. After a brief period of time (e.g., 25 msec) from when the conveying drive source 204 is converted into the braking energy creating condition, the conveying drive source 204 is converted from the braking energy creating condition to the reversely rotating energy creating condition (TR2 and TR3 are turned on). Then, the document conveying means 74 is driven to reversely rotate, and the second document is reversely conveyed on the transparent plate 8 toward the upstream. After the counting of pulses generated from the pulse generator 198 is started and after, for example, eight pulses are counted from the moment at which the conveying drive source 204 was converted into the reversely rotating energy creating condition, the conveying drive source 204 is converted again into the braking energy creating condition, maintained in this breaking energy creating condition for some period of time (e.g., 25 msec), and is then placed under free condition (TR1, TR2, TR3 and TR4 are all turned off). Thus, the brake is applied in a relatively small suitable amount to the conveying drive source 204 and, hence, to the document conveying means 74. Therefore, the document conveying means 74 discontinues the conveying action, the document is no more conveyed (no more conveyed by reverse rotation) by the document conveying means 74, and the second introduced document is placed in position on the transparent plate 8, i.e., placed at a position where the trailing edge (left end edge in FIG. 3) is caused to abut against the right end edge of the document placing position restricting member 10. Then, the control means 196 of the automatic document conveying device 4 sends a signal to the control means 200 of the electrostatic copying machine 2 which then executes the copying steps for the second document.

When the copying step for the second document is finished in the electrostatic copying machine 2 or is advanced up to a predetermined stage, the control means 200 of the electrostatic copying machine 2 sends a document change signal to the control means 196 of the automatic copying device 4. Then, the second document is discharged onto the first document receiving tray 94 quite in the same manner as in the case of the first document (the conveying drive source 204 that is set to the normally rotating condition in response to the production of the document change signal, is returned back to the free condition after a predetermined period of time has passed which may, for example, be 520 msec in order that the second document is delivered from the transparent plate 8 onto the document delivery passage 132).

Figure 8:
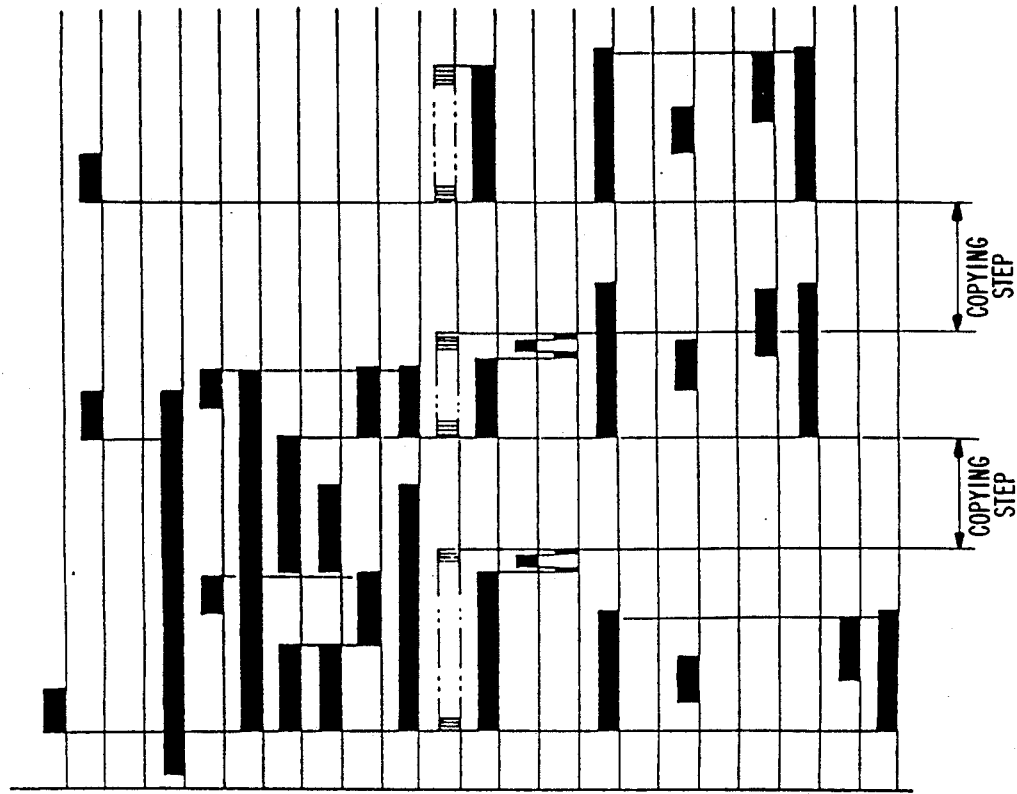
FIG. 8 is a time chart showing the procedure of operations of when the automatic document conveying device shown in FIG. 1 is operated in a simple mode.

In the case shown in FIG. 8, on the other hand, only two pieces of documents are placed on the document table 20 at the start of operation. When the second piece of document is introduced onto the transparent plate 8 as described above, therefore, the placed document detector 66 no more detects the document. In this case, the document sending roller 46, the separation roller pair 48 and the document introduction means 44 are not operated again. When three or more pieces of documents are placed on the document table 20, however, the third and subsequent documents are introduced in succession onto the transparent plate 8 just in the same manner as the second document, and are discharged onto the first document receiving tray 94.

REVERSING MODE

Figure 9:
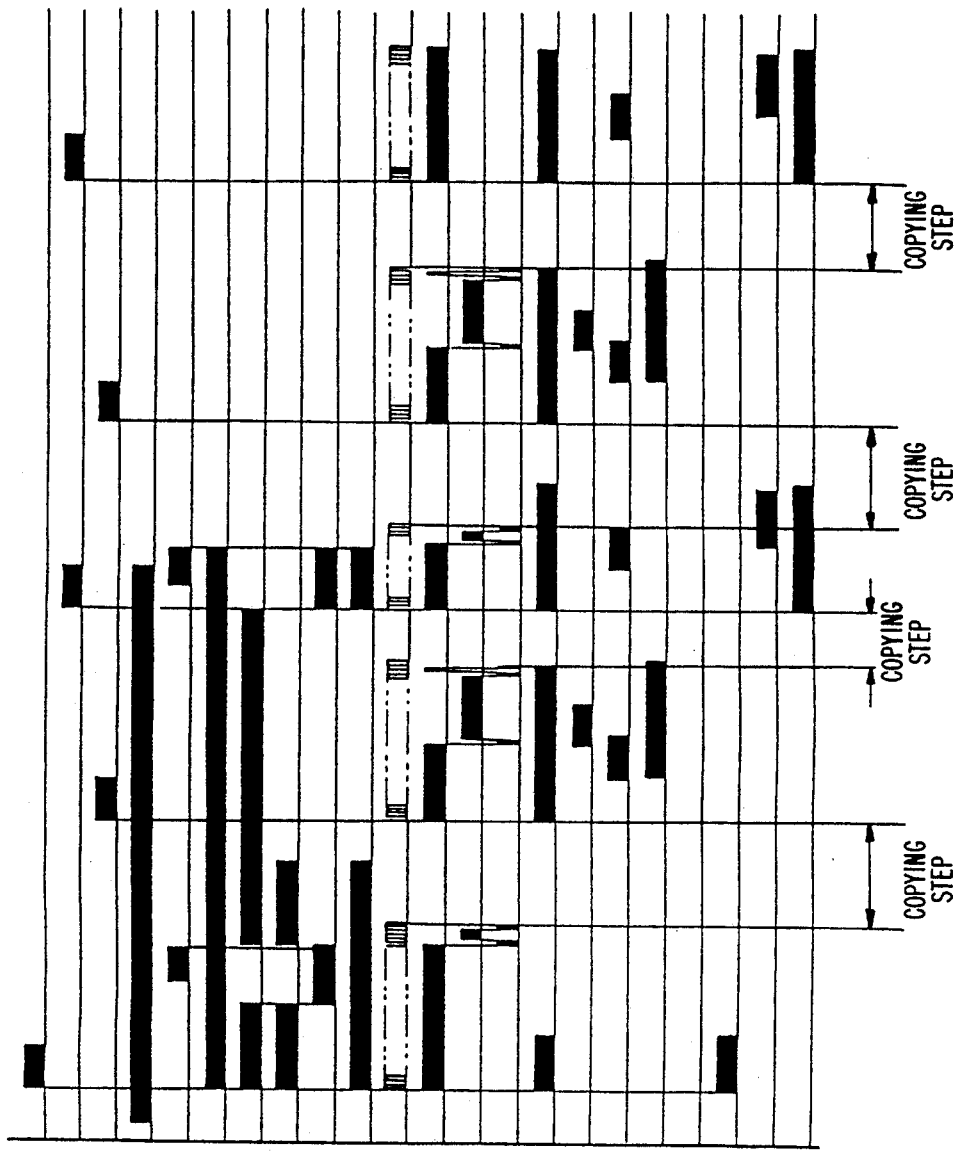
FIG. 9 is a time chart showing hte procedure of operations of when the automatic document conveying device shown in FIG. 1 is operated in a reversing mode.

When the reversing mode is selected, the automatic document conveying device 4 operates as described below. FIG. 9 is a time chart of operation of when the reversing mode is selected. The operation of the case of the reversing mode is basically the same as the operation of the case of the simple mode from the step where the first document taken out from the plurality pieces of documents placed on the document table 20 is placed in position on the transparent plate 8 up to the step where the next document on the document table 20 is delivered until the leading edge thereof is caused to abut against the document introduction means 44, as will be easily comprehended from the comparison of FIG. 8 that is a time chart of operation of when the simple mode is selected with FIG. 9 that is a time chart of operation of when the reversing mode is selected.

In the case of the reversing mode as will be described later, however, the document delivered from the transparent plate 8 is discharged from the second discharge opening 116 onto the second document receiving tray 168 through the common passage 136 and the second branched passage 140 in the document delivery passage 132 (i.e., the second document discharging method is executed). When the operation start signal is produced, therefore, the discharge re-introduction switching solenoid SL5 is energized instead of the branched passage switching solenoid SL4, and the discharge re-introduction switching means 144 is switched to the discharging position indicated by the two-dot chain line in FIG. 3. The document that is left unremoved from the transparent plate 8, therefore, is discharged from the first discharge opening 114 onto the first document receiving tray 94 through the common passage 136 and the first branched passage 138 in the document delivery passage 132. Consequently, the unremoved document is never mixed into the ordinary documents that are discharged onto the second document receiving tray 116. The procedure of operation for discharging the unremoved document in the case of the reversing mode is substantially the same as the procedure of operation for discharging the unremoved document of the case of the simple mode, except that the unremoved document is discharged onto the first document receiving tray 94 in the former case and that the unremoved document is discharged onto the second document receiving tray 168 in the latter case. FIG. 9 illustrates the procedure of operation of the case when no document is left to stay on the transparent plate 8. When no document is left on the transparent plate 8, no document is delivered from the transparent plate 8 onto the common passage 136 of the document delivery passage 132, and no document is detected by the delivered document detector 170 within a predetermined period of time after the operation of the automatic document conveying device 4 is started. In such a case, the delivery re-introduction drive source 206 is de-energized after a predetermined period of time (e.g., 275 msec) from when the operation start signal was produced, whereby the discharge re-introduction switching solenoid SL5 is de-energized, and the discharge re-introduction switching means 144 is returned back to the re-introduction position indicated by the solid line in FIG. 3. (When no document is left on the transparent plate 8 in the case of the simple mode, the delivery re-introduction drive source 206 is de-energized after the passage of a predetermined period of time that may, for example, be 275 msec from when the operation start signal was formed, whereby the branched passage switching solenoid SL4 is de-energized, and the branched passage switching means 142 is returned back to the first branched position indicated by the solid line in FIG. 3.)

When the copying step for the first document (more specifically, the front surface thereof) placed in the required position on the transparent plate 8 is in finished in the electrostatic copying machine 2 or is advanced up to a predetermined stage, the control means 200 in the electrostatic copying machine 2 feeds a document reversal signal to the control means 196 in the automatic conveying document device 4. Then, the conveying drive source 204 is set to the normally rotating energy creating condition, the document conveying means 74 is normally rotated, and the delivery and re-introduction drive source 206 is energized. Thus, the first document on the transparent plate 8 is delivered onto the document delivery passage 132 by the action of the document conveying means 74 and is further conveyed by conveying means (delivery roller 120, discharge rollers 154 and 156) in the document delivery and re-introduction passage 16. The document that is delivered onto the document delivery passage 132 is detected by the delivered document detector 170. When the delivered document detector 170 detects the leading edge of the delivered document, the delivery re-introduction switching solenoid SL3 is energized and the delivery re-introduction switching means 146 is switched over to the re-introduction position indicated by the two-dot chain line in FIG. 3. On the other hand, the branched passage switching means 142 remains maintained at the first branched position indicated by the solid line in FIG. 3, and the discharge re-introduction switching means 144 remains maintained at the re-introduction position indicated by the solid line in FIG. 3. Therefore, the first document delivered onto the document delivery passage 132 is introduced onto the first branched passage 138 from the common passage 136, introduced onto the re-introduction passage 134, and is re-introduced onto the transparent plate 8 from the side of the downstream end thereof (from the side of right end in FIG. 3). As will be comprehended with reference to FIG. 3, the document is reversed when it is conveyed through the common passage 136 of the document delivery passage 132, the first branched passage 138, and the re-introduction passage 134. Therefore, the document is re-introduced onto the transparent plate 8 with its back surface being downwardly faced. The document that is conveyed through the re-introduction passage 134 is detected by the re-introduced document detector 175. After a brief period of time (e.g., 25 msec) from the moment when the leading edge of the document is detected by the re-introduced document detector 175, the conveying drive source 204 is converted from the normally rotating energy creating condition to the braking energy creating condition. After another brief period of time (e.g., 25 msec), the conveying drive source 204 is converted from the braking energy creating condition to the reversely rotating energy creating condition, and the document conveying means 74 is driven to reversely rotate. At this moment, the leading edge of the document is not yet reaching the transparent plate 8, and the document conveying means 74 does not yet act upon the document. When the document is re-introduced from the re-introduction passage 134 onto the transparent plate 8, however, the document conveying means 74 that is reversely rotating acts upon the document which is then conveyed along the transparent plate 8 in the reverse direction, i.e., toward the upstream (toward the left in FIG. 3). When, for example, 290 pulses (corresponds to about 290 mm of the document conveying length) generated by the pulse generator 198 are counted starting from the moment when the leading edge of the document is detected by the re-introduced document detector 175, the conveying drive source 204 is converted from the reversely rotating energy creating condition to the braking energy creating condition. Thus, the brake is applied to the conveying drive source and, hence, to the document conveying means 74. After a brief period of time (e.g., 25 msec) from when the conveying drive source 204 is converted into the braking energy creating condition, the conveying drive source 204 is further converted from the braking energy creating condition into the normally rotating energy creating condition. Even at such a moment, the conveying drive source 204 and the document conveying means 74 continue to rotate normally due to inertia. Accordingly, when the conveying drive source 204 is set to the normally rotating energy creating condition, the brake of a relatively great amount is applied compared to when the conveying drive source 204 and document conveying means 74 are reversely rotating. After a brief period of time (e.g., 25 msec) from when the conveying drive source 204 is converted into the normally rotating energy creating condition, the conveying drive source 204 is converted again from the normally rotating energy creating condition into the braking energy creating condition. Consequently, more brake is applied to the conveying drive source 204 and the document conveying means 74. Thus, the conveying drive source 204 and the document conveying means are brought into halt from the reversely rotating condition. After a brief period of time (e.g., 25 msec) from when the conveying drive source 204 is converted into the braking energy creating condition, the conveying drive source 204 is placed under free condition. Therefore, at a moment when the conveying drive source 204 is converted into the braking energy creating condition from the reversely rotating energy creating condition, the leading edge of the document (left end edge in FIG. 3) conveyed on the transparent plate 8 toward the upstream (toward the left in FIG. 3) is positioned on the downstream side (right side in FIG. 3)

slightly beyond the document placing position restricting member 10. As described above, the conveying drive source 204 is converted into the braking energy creating condition to apply the brake in a relatively small amount, then converted into the normal rotating energy creating condition to apply the brake in a relatively large amount, and is then converted into the braking energy creating condition to apply the brake in a relatively small amount, whereby the document conveying means 74 is caused to rest from the reversely rotating condition and the document is no more conveyed toward the upstream. Even during when the brake is being applied to the document conveying means 74 as described above, the document is conveyed toward the upstream to some extent. At a moment when the document conveying means 74 is stopped and conveyance of the document is stopped, the document is placed in the required position on the transparent plate 8, i.e., placed at a position where the leading edge thereof (left end edge in FIG. 3) is caused to abut against the document placing position restricting member 10. At a moment when the conveying drive source 204 is converted from the braking energy creating condition into the free condition as described above, the delivery and re-introduction drive source 206 is de-energized. After, for example, 200 pulses generated by the pulse generator 198 are counted starting from the moment when the trailing edge of the document is detected by the re-introduced document detector 175, the delivery re-introduction switching solenoid SL3 is de-energized and the delivery re-introduction switching means 144 is returned back to the delivery position indicated by the solid line in FIG. 3.

When the re-introduced document is positioned at a required position as described above, the control means 196 of the automatic document conveying device 4 sends a signal to the control means 200 of the electrostatic copying machine 2, and a required copying step is started by the electrostatic copying machine 2 for the back surface of the document that is re-introduced.

Attention should be given to the following fact in positioning the document that is to be introduced or re-introduced onto the transparent plate 8. That is, when the document is introduced and positioned onto the transparent plate 8 from the document table 20, the document conveying means 74 is reversely rotated for a relatively short period of time at the final stage of conveying the document. Therefore, the reversely driving speed of the document conveying means 74 does not increase to a so-called rated speed, and the document conveying means 74 has a relatively small inertia of reversed driving at the moment when the conveying drive source 204 that drives the document conveying means 74 is converted from the reversely rotating energy creating condition into other condition. Therefore, if the brake of a relatively small amount is applied while converting the conveying drive source 204 from the reversely rotating energy creating condition into the braking energy creating condition, the document conveying means 74 can be stopped as required and the document can be positioned at a required position. On the other hand, when the document is re-introduced onto the transparent plate 8 from the side of the downstream end and is place din position on the transparent plate 8, the document conveying means 74 is reversely rotated for a relatively long period of time. Therefore, the reversely driving speed of the document conveying means 74 is increased to a so-called rated speed, and the document conveying means 74 has a relatively great inertia of reversed driving at the moment when the conveying drive source 204 is converted from the reversely rotating energy creating condition into other condition. In view of the above fact, when the document is re-introduced and is placed in the required position on the transparent plate 8, the conveying drive source 204 is converted from the reversely rotating energy creating condition into the braking energy creating condition to apply the brake of a relatively small amount, and is converted into the normally rotating energy creating condition to apply the brake of a relatively large amount, and is then converted into the braking energy creating condition to apply the brake of a relatively small amount. Thus, the brake of a relatively large amount as a sholw is applied to bring the document conveying means 74 into halt as required and to position the document at a required position.

After the back surface of the document that was reversed and re-introduced as described above is subjected to the copying step or up to a predetermined stage in the electrostatic copying machine 2, the control means 200 in the electrostatic copying machine 2 sends a document change signal to the control means 196 of the automatic document conveying device 4. Then, the document on the transparent plate 8 is discharged, i.e., the first piece of document subjected to the copying for both the front and back surfaces thereof is discharged, and the second document that had been caused at its leading edge to abut against the document introduction means 44 and that had been temporarily prevented from advancing, is now introduced onto the transparent plate 8. The discharge of the first document and the introduction of the second document are substantially the same as the discharge of the first document in the aforementioned simple mode (the document is simply introduced but is neither reversed nor re-introduced) and the introduction of the second document, except the following point. In the simple mode, the branched passage switching means 142 is held at the first branched position indicated by the solid line in FIG. 3, and the discharge re-introduction switching solenoid SL5 is energized so that the discharge re-introduction switching means 144 is positioned at the discharge position indicated by the two-dot chain line in FIG. 3. Then, the first document is introduced onto the first branched passage 138 from the common passage 136 of the document delivery passage 132 and is discharged onto the first document receiving tray 94 from the first discharge opening 114. In the reversing mode, on the other hand, the branched passage switching solenoid SL4 is energized and the branched passage switching means 142 is positioned at the second branched position indicated by the two-dot chain line in FIG. 3. Then, the first document is introduced onto the second branched passage 140 from the common passage 136 of the document delivery passage 132, and is discharged onto the second document receiving tray 168 from the second discharge opening 116.

After the second document introduced to a required position on the transparent plate 8 is subjected to the copying step or up to a predetermined stage in the electrostatic copying machine 2, the control means 200 of the electrostatic copying machine 2 sends a document reversal signal to the control means 196 of the automatic document conveying device 4. Then, quite like the case of the first document, the second document on the transparent plate 8 is conveyed through the common passage 136 of the document delivery passage 132, the first branched passage 138 and the document re-introduction passage 134, and is re-introduced with the surface and back reversed onto the transparent plate 8. Then, the electrostatic copying machine 2 starts the copying step for the back surface of the second document that is re-introduced.

In the case diagramed in FIG. 9, on the other hand, only two pieces of documents are placed on the document table 20 at the time of starting the operation, like in the aforementioned case of the simple mode. Therefore, when the second document is introduced onto the transparent plate 8 via the document introduction passage 40 as described above, no document is detected by the placed document detector 66. In this case, the document sending roller 46, the separation roller pair 48, and the document introduction means 44 are not driven any more. When three or more documents are placed on the document table 20, the third and subsequent documents are introduced onto the transparent plate 8 quite in the same manner as the second document, introduced again onto the transparent plate 8 after being reversed, and are discharged onto the second document receiving tray 168.

After the back surface of the second document that was re-introduced onto the transparent plate 8 is subjected to the copying step or up to a predetermined stage in the electrostatic copying machine 2, the control means 200 of the electrostatic copying machine 2 sends a document change signal to the control means 196 of the automatic document conveying device 4. Then, the second document is discharged onto the second document receiving tray 168 from the transparent plate 8 quite in the same manner as the case of the first document.

DOUBLE REVERSING MODE

Next, described below is the operation of the automatic document conveying device 4 of when the double reversing mode is selected. If described with reference to FIGS. 3 and 10, the plural pieces of documents are placed on the document table 20 with the surface downwardly faced and the placed document detector 66 detects the document that is placed, so that the automatic document conveying device 4 is ready to operate. Then, as the operator operates the copy start switch disposed on the electrostatic copying machine 2, the control means 200 of the electrostatic copying machine 2 sends the operation start signal as well as the document reversal switch to the control means 196 of the automatic document conveying device 4. Then, the delivery solenoid SL1 is energized so that the document sending roller 46 is lowered as indicated by the two-dot chain line in FIG. 3, and the separation solenoid SL2 is energized so that the reversal roller 54 of the separation roller pair 48 moves to the acting position indicated by the two-dot chain line in FIG. 3. Furthermore, the introduction drive source 202 is energized, the delivery and separation clutch CL1 is energized, and hence, the document sending roller 46 and the separation roller pair 48 are driven. Thus, the uppermost document out of the plurality of documents placed on the document table 20 is delivered onto the document introduction passage 40.

Figure 10:
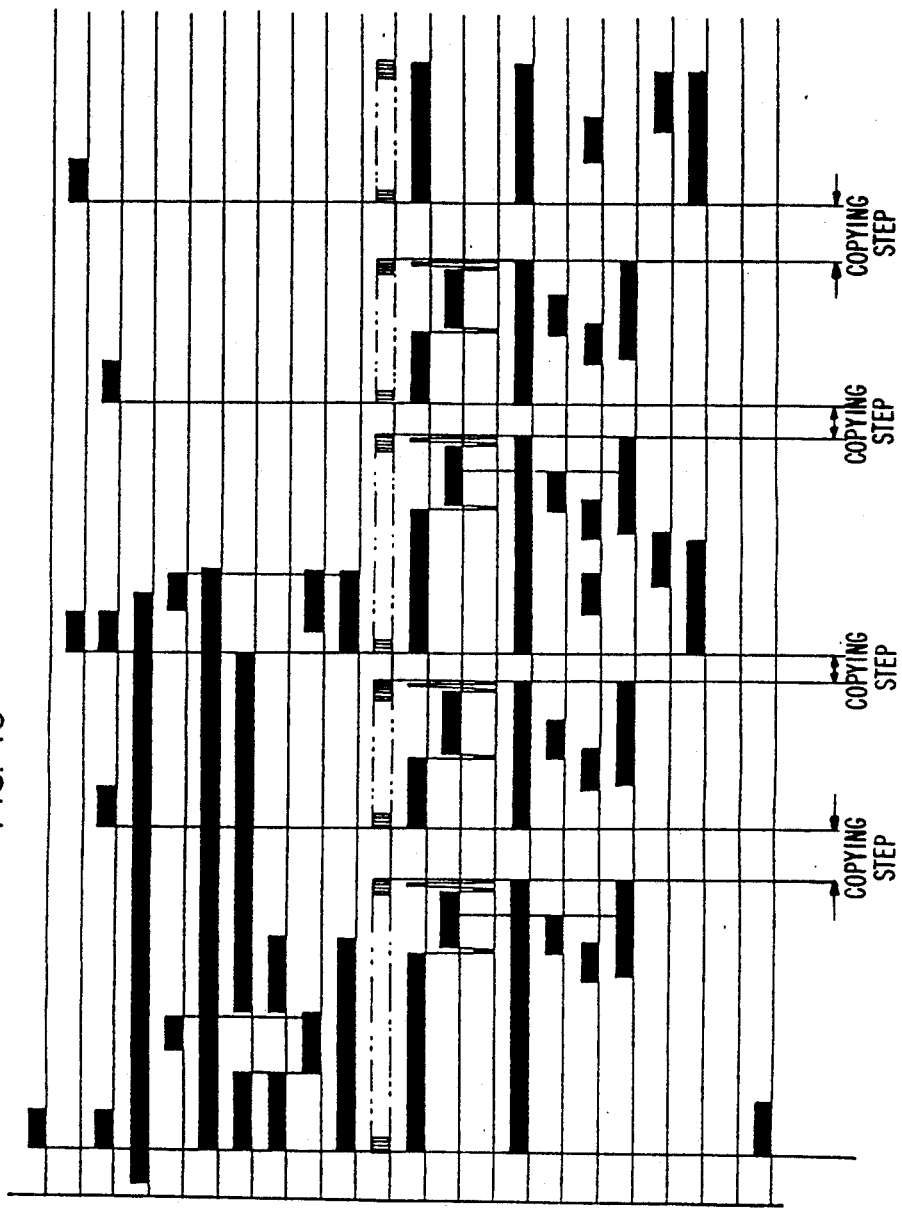
FIG. 10 is a time chart showing the procedure of operations of when the automatic document conveying device shown in FIG. 1 is operated in a double reversing mode.

When the operation start signal and the document reversal signal are supplied, furthermore, the conveying drive source 204 is set to the normally rotating condition whereby the document conveying means 74 is driven to rotate normally and the delivery and re-introduction drive source 206 is energized so that the driven elements (delivery roller 120, discharge rollers 154 and 156) disposed in the delivery and re-introduction passage 16 are driven. Therefore, when the document manually placed on the transparent plate 8 of the electrostatic copying machine 2 is left unremoved, the document conveying means 74 works to deliver such an unremoved document from the transparent plate 8 onto the document delivery passage 132 so that the document is discharged therethrough. When the double reversing mode is executed as will be further described later, the ordinary document introduced onto the transparent plate 8 from the document table 20 is discharged onto the first document receiving tray 94 from the first discharge opening 114 through the common passage 136 of the document delivery passage 132 and the first branched passage 138, like the aforementioned case of when the simple mode is executed (i.e., the first document discharging method is executed). When the operation start signal and document reversal signal are supplied, on the other hand, the branched passage switching solenoid SL4 is energized too, and the branched passage switching means 142 is switched over to the second branched position indicated by the two-dot chain line in FIG. 3. Therefore, the document that is left unremoved is introduced onto the second branched passage 140 from the common passage 136 of the document delivery passage 132, and is discharged onto the second document receiving tray 168 through the second discharge opening 116 (the unremoved document is discharged in the same manner as that of when the aforementioned simple mode is executed). This makes it possible to reliably avoid the possibility that the unremoved document is mixed into the ordinary documents discharged onto the first document receiving tray 94. FIG. 10 illustrates the case of when there is no document that is left unremoved. In this case, the branched passage switching solenoid SL4 is de-energized after the passage of a predetermined period of time (e.g., 275 msec) from when the branched passage switching solenoid SL4 was energized.

Description will be further made of the document delivered from the document table 20. The document introduced onto the document introduction passage 40 from the document table 20 is caused at its front edge to abut against the document introduction means 44 that is at rest, and is temporarily prevented from advancing. After a predetermined period of time (e.g., 375 msec) from when the operation start signal and the document reversal signal were formed, the separation solenoid SL2 is de-energized and the reversal roller 54 of the separation roller pair 48 returns back to the non-acting position indicated by the solid line in FIG. 3. Further, the delivery and separation clutch CL1 is de-energized, and the sending roller 46 and the separation roller pair 48 are caused to rest. At the same time, the introduction clutch CL2 is energized and the document introduction means 44 is driven. Then, introduction of the document is started by the document introduction means 44, and the document that had been temporarily prevented from advancing is introduced onto the transparent plate 8 through the document introduction passage 40. At this moment, the document is detected by the plurality of introduced document detectors 68 just like the aforementioned cases of the simple mode and reversing mode. After a brief period of time (e.g., 20 msec) from when the trailing edge of the introduced document has passed through a particular one introduced document detector among the plurality of introduced document detectors 68, the introduction clutch CL2 is de-energized and the document introduction means 44 stops. Thereafter, the document partly introduced onto the transparent plate 8 continues to be conveyed by the document conveying means 74 that is under the normally rotating condition. As the introduction clutch CL2 is de-energized, the separation solenoid SL2 is energized again and the reversal roller 54 of the separation roller pair 48 is raised again to the acting position indicated by the two-dot chain line in FIG. 3. Further, the delivery and separation clutch CL1 is energized, the sending roller 46 and the separation roller pair 48 are driven again, and the next document, i.e., the second piece of document is delivered from the document table 20. The document is caused at its leading edge to abut against the document introduction means 44 that is at rest and is temporarily prevented from advancing. After a predetermined period of time (e.g., 375 msec) from when the delivery and separation clutch CL1 was energized, the delivery and separation cluch CL1 is de-energized, the introduction drive source 202 is de-energized, and the sending roller 46 and the separation roller pair 48 are no more driven.

When the double reversing mode is executed, on the other hand, the document introduced onto the transparent plate 8 continues to be further conveyed without stopping on the transparent plate 8, and is delivered onto the document delivery passage 132 from the transparent plate 8. As the document is delivered onto the document delivery passage 132, the leading edge of the delivered document is detected by the delivered document detector 170. Then, the delivery re-introduction switching solenoid SL3 is energized and the delivery re-introduction switching means 146 is switched over to the re-introduction position indicated by the two-dot chain line in FIG. 3. On the other hand, the branched passage switching means 142 remains maintained at the first branched position indicated by the solid line in FIG. 3, and the discharge re-introduction switching means 144 remains maintained at the re-introduction position indicated by the solid line in FIG. 3. Therefore, the document delivered onto the document delivery passage 132 is introduced from the common passage 136 thereof onto the first branched passage 138, introduced onto the re-introduction passage 134, and is introduced again onto the transparent plate 8 from the side of the downstream end (from the side of right end in FIG. 3). When the document is re-introduced onto the transparent plate 8 as described above, the surface of the document is reversed and the document is re-introduced onto the transparent plate 8 with its back surface being directed downwards as will be easily understood with reference to FIG. 3. The conveying drive source 204 is converted from the normally rotating energy creating condition to the braking energy creating condition after a brief period of time (e.g., 25 msec) from the moment when the leading edge of the document passing through the re-introduction passage 134 was detected by the re-introduced document detector 175. After another brief period of time (e.g., 25 msec), the conveying drive source 204 is converted from the braking energy creating condition into the reversely rotating energy creating condition, and the document conveying means 74 starts to be driven reversely. At this moment, the leading edge of the document is not yet reaching the transparent plate 8, and the document conveying means 74 does not yet act upon the document. When the document is re-introduced from the re-introduction passage 134 onto the transparent plate 8, however, the document conveying means 74 that is reversely rotating acts upon the document to convey it along the transparent plate 8 in the opposite direction, i.e., toward the direction of upstream (toward the left direction in FIG. 3). After, for example, 290 pulses generated by the pulse generator 198 are counted starting from the moment when the leading edge of the document re-introduced onto the transparent plate 8 passing through the re-introduction passage 134 was detected by the re-introduced document detector 175, the conveying drive source 204 is converted from the reversely rotating energy creating condition into the braking energy creating condition. Thus, the brake is applied to the conveying drive source 204 and, hence, to the document conveying means 74. After a brief period of time (e.g., 25 msec) has passed, the conveying drive source 204 is converted from the braking energy creating condition into the normally rotating energy creating condition. Even at such a moment, the conveying drive source 204 and the document conveying means 74 are under the normally rotating condition due to the inertia. When the conveying drive source 204 is converted into the normally rotating energy creating condition, therefore, the brake of a relatively large amount is applied to the conveying drive source 204 and the document conveying means 74 that are under the reversely rotating condition. After the passage of a brief period of time (e.g., 25 msec) from when the conveying drive source 204 was converted into the normally rotating energy creating condition, the conveying drive source 204 is further converted into the braking energy creating condition. Thus, the brake is further applied to the conveying drive source 204 and to the document conveying means 74; therefore, the conveying drive source 204 and the document conveying means 74 are brought into halt from the condition of reverse rotation. Thus, the document is placed at a required position on the transparent plate 8 (i.e., at a position where the leading edge of the document is caused to abut against the document placing position restricting member 10). Such a positioning of document is substantially the same as the positioning of document that is re-introduced onto the transparent plate 8 after reversed in the above-mentioned reversing mode. After the passage of a brief period of time (e.g., 25 msec) from when the conveying drive source 204 was converted into the braking energy creating condition, the conveying drive source 204 is returned back to the free condition. At the same time, the delivery and re-introduction drive source 206 is de-energized. After, for example, 200 pulses generated by the pulse generator 198 are counted starting from the moment when the trailing edge of the document re-introduced onto the transparent plate 8 via the re-introduction passage 134 was detected by the re-introduced document detector 175, the delivery re-introduction switching solenoid SL3 is de-energized and the delivery re-introduction switching means 144 is returned back to the delivery position indicated by the solid line in FIG. 3.

As described above, the first document is delivered from the document table 20, reversed front surface back after it has passed through the transparent plate 8, introduced again onto the transparent plate 8, and is placed at a required position. Then, the control means 196 of the automatic document conveying device 4 sends a signal to the control means 200 of the electrostatic copying machine 2, whereby the required copying step is executed for the back surface of the first document.

After the back surface of the first document is subjected to the copying step or up to a predetermined stage in the electrostatic copying machine 2, the control means of the electrostatic copying machine 2 sends the document reversal signal to the control means 196 of the automatic document conveying device 4. Then, the document on the transparent plate 8 is delivered onto the document delivery passage 132, reversed front surface back again (i.e., the front surface is directed downwards) as it passes through the common passage 136 of the document delivery passage 132, first branched passage 138 and re-introduction passage 134, introduced again onto the transparent plate 8, and is placed again at a required position on the transparent plate 8. The reversal and re-introduction of the document are substantially the same as the reversal and re-introduction of the document in the aforementioned reversing mode.

When the first document is positioned again at a required position on the transparent plate 8 as described above, the control means 196 of the automatic document conveying device 4 sends a signal to the control means 200 of the electrostatic copying machine 2 which then commences the copying step for the front surface of the first document. When the copying step is finished or has proceeded up to a predetermined stage, the control means 200 of the electrostatic copying machine 2 sends the document change signal as well as the document reversal signal to the control means 196 of the automatic document conveying device 4. Then, the document on the transparent plate 8 starts to be discharged, i.e., the first document subjected to the copying for both the front and back surfaces thereof starts to be discharged, and the second document which had been abutted at its leading edge to the document introduction means 44 and which had been temporarily prevented from advancing starts to be introduced. The first document is discharged substantially in the same manner as the first document in the aforementioned simple mode except the below-mentioned respect. In the double reversing mode, the second document that is started to be introduced passes on the transparent plate 8 without stopped on the transparent plate 8, and is delivered onto the document delivery passage 132 so as to be reversed. In view of such a point in the double reversing mode, the discharge and re-introduction switching solenoid SL5 is de-energized and the discharge re-introduction switching means 144 is returned back to the re-introduction position indicated by the solid line in FIG. 3 when the leading edge of the second document delivered onto the document delivery passage 132 passing on the transparent plate 8 is detected by the delivered document detecting means 170. On the other hand, the second document that is started to be introduced is delivered onto the document delivery passage 132 passing on the transparent plate 8, reversed front surface back as it passes through the common passage 136 of the document delivery passage 132, first branched passage 140 and re-introduction passage, re-introduced onto the transparent plate 8, and is positioned at a required position on the transparent plate 8, just like the case of the first document.

In the case shown in FIG. 10, on the other hand, only two pieces of documents are placed on the document table 20. Therefore, when the second document is introduced through the document introduction passage 40 as described above, no document is detected by the placed document detector 66. In this case, after the passage of a brief period of time (e.g., 20 msec) from the moment when the trailing edge of the second document was detected by the introduced document detector 68, the introduction clutch CL2 is de-energized, the introduction drive source 202 is de-energized, the delivery solenoid SL1 is de-energized, and the sending roller 46 is returned back to the non-acting position indicated by the solid line in FIG. 3. When three or more documents are placed on the document table 20, the third and subsequent documents are processed quite in the same manner as the second document, as a matter of course.

When the second document is positioned at a required position on the transparent plate 8 with its back surface being faced downwards, the control means 196 of the automatic document conveying device 4 sends a signal to the control means 200 of the electrostatic copying machine 2, and the copying step is effected in the electrostatic copying machine 2 for the back surface of the second document. When the copying step is finished or has proceeded up to a predetermined stage, the control means 200 of the electrostatic copying machine 2 sends a document reversal signal to the control means 196 of the automatic document conveying device 4. Then, the document on the transparent plate 8 is delivered onto the document delivery passage 132, reversed again front surface back, re-introduced onto the transparent plate 8 with its front surface faced downwards, and is placed at a required position on the transparent plate 8 just like the case of the first document. Then, the copying step in the electrostatic copying machine 2 for the front surface of the second document is started.

When the copying step is finished or has proceeded up to a predetermined stage for the front surface of the second document, the control means 200 of the electrostatic copying machine 2 sends a document change signal to the control means 196 of the automatic document conveying device 4. Then, the second document on the transparent plate 8 after subjected to the copying for both the front and back surfaces thereof, is discharged onto the first document receiving tray 94 through the common passage 136 and the first branched passage 138 in the document delivery passage 132. At the moment when the second document is discharged, the next document is not discharged onto the document discharge passage 132. Therefore, at a moment when the rear edge of the second document is detected by the first discharged document detecting means 172, the discharge re-introduction switching solenoid SL5 is de-energized, and the discharge re-introduction switching means 144 is returned back to the re-introduction position indicated by the solid line in FIG. 3.

In the foregoing was closely described a preferred embodiment of the automatic document conveying device constituted according to the present invention with reference to the accompanying drawings. However, the present invention is in no way limited to the above embodiment only but can be modified or varied in a variety of other ways without departing from the scope of the present invention.

What we claim is:

1. An automatic document conveying device to be applied to an image processor disposed in a transparent plate on which to place a document to be processed, the transparent plate being disposed on the upper surface of a housing, said device comprising
    a document table, a document introduction passage extending from the document table to one end edge of the transparent plate, a first document receiving tray, a second document receiving tray, a document delivery passage comprising a common passage extending from the other end edge of the transparent plate, a first branched passage extending from the downstream end of the common passage to the first document receiving tray, and a second branched extending from the downstream end of the common passage to the second document receiving tray, a branched passage switching means adapted to be positioned selectively at a first branching position at which the common passage in the document delivery passage is communicated with a first branched passage and at a second branching position at which the common passage is communicated with a second branched passage, a document sending means for sending out a plurality of documents placed on the document table piece by piece into the document introduction passage, a document introduction means for introducing the document sent out into the document introduction passage onto the transparent plate, a document conveying means mounted on a movable frame member mounted for free movement between a closed position at which it covers the transparent plate and an open position at which the transparent plate is exposed to view, and when the movable frame member is held at the closed position, said document conveying means conveys the document along the transparent plate, a document delivering means for discharging the document delivered by the document conveying means to the common passage of the document delivery passage through the common passage of the document delivery passage and the first branched passage or the second branched passage. and an operation controlling means;

wherein the operation controlling means selectively performs a first document discharging method wherein the branched passage switching means is held at the first branching position and the document positioned at a required position on the transparent plate is discharged onto the first document receiving tray through the common passage and the first branched passage in the document delivery passage and a second document discharging method wherein the branched passage switching means is held at the second branching position and the document positioned at a required position on the transparent plate is discharged onto the second document receiving tray through the common passage and the second branched passage in the document passage delivery passage;

when a first document among a plurality of documents placed on the document table is introduced onto the transparent plate from the document table through the document introduction passage, and if an unwanted document is present on the transparent document, the branched passage switching means is held at the second branching position to discharge the unwanted document onto the second document receiving tray through the common passage and the second branched passage in the document delivery passage prior to performing the first document discharging method and when the second document discharging method is to be performed, the branched passage switching means is held at the first branching position prior to it, and the unwanted document is discharged onto the first document receiving tray through the common passage and the first branched passage in the document delivery passage.

2. The automatic document conveying device of claim 1 which further comprises a re-introduction passage branched from the first branched passage and extends to the other end edge of the transparent plate, and a discharging re-introduction switching means adapted to be held selectively at a discharge position to discharge a document advanced into the first branched passage onto the first document receiving tray through the first branched passage and at a re-introduction position to introduce a document introduction passage;

wherein the operation controlling means selectively performs a simple mode, a reversing mode and a double reversing mode, and in the simple mode and the double reversing mode, the first document discharging method is performed;

in the simple mode, the document on the document table is introduced onto the transparent plate through the document introduction passage and positioned at a required position of the transparent plate, and thereafter, the document is discharged onto the first document receiving tray through the common passage and the first branched passage in the document deliver passage;

in the double reversing mode, the document delivered onto the transparent plate from the document table through the document introduction passage is advanced into the first branched passage from the common passage in the document delivery passage, and then introduced to the re-introduction passage and re-introduced onto the transparent plate, and thus, the surface and the back of the document are reversed and the document is held at a required position on the transparent plate, and thereafter, the document is again advanced into the first branched passage from the common passage in the document delivery passage, and then introduced onto the re-introduction passage and reintroduced onto the transparent plate, and thus, the surface and back of the document are again reversed and the document is held at a required position on the transparent plate, and thereafter, the document on the transparent plate is discharged onto the first document receiving tray through the common passage and the first branched passage in the document delivery passage;

in the reversing mode, the second document discharging method is performed, the document on the document table is introduced onto the transparent plate through the document introduction passage and hold it at a required position on the transparent plate, and thereafter, the document is advanced into the first banched passage from the common passage in the document delivery passage, and then introduced into the re-introduction passage and re-introduced onto the transparent plate, and thus, the surface and the back of the document are reversed and the document is again placed at a required position on the transparent plate, and thereafter, the document on the transparent plate is discharged onto the second document receiving tray through the common passage and the second branched passage in the document delivery passage.

3. The automatic document conveying device of claim 1 which further comprises a delivered document detectihg means for detecting a document passing in the common passage in the document delivery passage, in which when a first document among a plurality of documents placed on the document table is to be introduced onto the transparent plate from the document table through the document introduction passage, the operation controlling means actuates the document conveying means in the direction in which the document is delivered from the transparent plate onto the common passage in the document delivery passage, and when the delivered document detecting means detects the document within a predetermined period of time from the moment at which the document conveying means begins this action, it recognizes that an unwanted document is present on the transparent plate.

4. The automatic document conveying device of claim 1 in which the first document receiving tray is disposed on the upper surface of the movable frame member, and when a document is discharged onto the first document receiving tray from the transparent plate through the common passage and the first branched passage in the document delivery passage, the surface and back of the document are reversed, and the second document receiving tray is disposed as isolated in the downstream direction from the other end edge of the transparent plate, and when the document is discharged onto the second document receiving tray from the transparent plate through the common passage and the second branched passage in the document delivery passage, the surface and back of the document are not reversed.

5. An automatic document conveying device to be applied to an image processor disposed in a transparent plate on which to place a document to be processed, the transparent plate being disposed on the upper surface of a housing, said device comprising
   a document table,
   a document introduction passage extending from the document table to one end edge of the transparent plate,
   a first document receiving tray,
   a second document receiving tray,
   a document delivering passage comprising a common passage extending from the other end edge of the transparent plate, a first branched passage extending from the downstream end of the common passage to the first document receiving tray, and a second branched extending from the downstream end of the common passage to the second document passage receiving tray,
   a branched passage switching means adapted to be positioned selectively at a first branching position to bring the common passage in the document delivering passage into communication with a first branched passage and at a second branching position to bring the common passage into communication with a second branched passage,
   a re-introduction passage branching from the first branched passage and extending to the other end edge of the transparent plate,
   a discharging re-introduction switching means adapted to be selectively held at a discharging position for discharging the document advanced into the first branched passage through the first branched passage onto the first document receiving tray and a re-introduction position for introducing the document advanced into the first branched passage into the re-introduction passage,
   a document sending means for sending out a plurality of documents placed on the document table piece by piece into the document re-introduction passage,
   a document introduction means for introducing the document sent out into the document introduction passage onto the transparent plate,
   a document conveying means for conveying the document along the transparent plate,
   a document delivery means for discharging the document delivered to the common passage of the document delivering passage by the document conveying means onto the first document receiving tray through the common passage and the first branched passage in the document delivery passage, or re-introducing it onto the transparent plate through the common passage of the document delivery passage and through the upstream portion of the first branched passage and the re-introduction passage, or discharging it onto the second document receiving tray through the common passage and the second branched passage in the document delivery passage, and
   an operation controlling means;
wherein
   the operation controlling means performs either one of a simple mode, a reversing mode, and a double reversing mode selectively,
   in the simple mode, the document on the document table is introduced onto the transparent plate through the document introduction passage and positioned at a required position on the transaprent plate, thereafter the branched passage switching means is held at the first branching position and the discharging re-introduction switching means is held at the discharge position, the document is moved through the common passage and the first branched passage in the document delivery passage, and thereby the surface and back of the document are reversed and the document is discharged onto the first document receiving tray;
   in the reversing mode, the document on the document table is introduced onto the transparent plate through the document introduction passage and positioned at a required position on the transparent plate, thereafter the branched passage switching means is held at the first branching position and the discharging re-introduction switching means is positioned in the re-introduction position, the document is advanced from the common passage in the document delivery passage into the first branched passage, then introduced into the re-introduction passage and re-introduced onto the transparent plate, and thus, the surface and back of the document are reversed and the document is again held at a required position on the transparent plate, and thereafter the branched passage switching means is held at the second branching position, and the document on the transparent plate is moved through the common passage and the second branched passage in the document delivery passage, and thus, the document is discharged onto the second document receiving tray without reversing its surface and back; and in the double reversing mode, the branched passage switching means is held at the first branching position and the discharging re-introduction switching means is held at the re-introduction position, and the document delivered to the transparent plate from the document table through the document introduction passage is advanced into the first branched passage from the common passage in the document delivery passage, and then introduced into the re-introduction passage and re-introduced onto the transparent plate, thus the surface and back of the document are reversed and the document is held at a required position on the transparent plate, and thereafter, the document is advanced again into the first branched passage again from the common passage in the document delivery passage, then introduced into the re-introduction passage and re-introduced onto the transparent plate, whereby the surface and back of the document are again reversed and the document is again held at a required position on the transparent plate, and thereafter the discharging re-introduction switching means is held at the discharging position, and the document on the transparent plate is moved through the common passage and the first branched passage in the document delivery passage, and thus the surface and back of the documents are reversed, and the document is discharged onto the first document receiving tray.

6. The automatic document conveying device of claim 5 in which a movable frame member is disposed movably between a closed position at which it covers the transparent plate and an open position at which it reveals the transparent plate to view, the document conveying means is mounted on the movable frame member, and when the movable frame member is held at the closed position, the document conveying means can move the document along the transparent plate; the document table is disposed as it is isolated in the upstream direction from the one end edge of the transparent plate separately from the movable frame member; the first document receiving tray is disposed on the upper surface of the movable frame member; and the second document receiving tray is disposed as it is isolated in the downstream direction from the other end edge of the transparent plate.

7. An automatic document conveying device to be applied to an image processor in which a transparent plate on which is placed a document to be processed is disposed on the upper surface of a housing and on one end edge of the transparent plate is mounted a document placing position restricting member against which one end of the document abuts, said device comprising
a document table disposed as it is isolated in the upstream direction from the one end edge of the transparent plate,
a document introduction passage extending from the document table to one end edge of the transparent plate,
a document receiving tray,
a document delivering passage extending from the other end edge of the transparent plate to the document receiving tray,
a re-introduction passage branching from the document delivery passage and extending to the other end edge of the transparent document,
a discharging re-introduction switching means adapted to be selectively held at a discharging position for discharging the document advanced into the document delivery passage into the document receiving tray through the document delivery passage and at a re-introduction position for introducing the document advanced into the document delivery passage into the re-introduction passage,
a document sending means for sending out a plurality of documents placed on the document table piece by piece into the document introduction passage,
a document introduction means for introducing the document sent out into the document introduction passage onto the transparent plate,
a document conveying means for conveying the document along the transparent plate,
a document delivery means for discharging the document delivered to the document delivery passage by the document conveying means into the document receiving tray through the document delivery passage, or re-introducing the document onto the transparent plate through the re-introduction passage from the document delivery passage, and
an operation control means;
wherein
the document conveying means is of the rotary driving type which can selectively perform a normal conveying drive by which the document is conveyed from the one end edge of the transparent plate toward its other end edge and reversely conveying drive by which the document is conveyed from the other end edge of the transparent plate to its one end edge;
the document conveying device selectively performs a normal document positioning method by which the document introduced onto the transparent plate from the document table through the document introduction passage is conveyed by the normal conveying drive of the document conveying means until the trailing end of the document reach a position isolated slightly downstream of the document placing position restricting member by normal rotation, and thereafter, by the reversely conveying drive of the document conveying means, the document is conveyed reversedly to allow the trailing end of the document to abut against the document placing position restricting member, and a reversal document positioning method by which the document is delivered from the transparent plate to the document delivery passage by the normal conveying drive of the document conveying means, the discharging re-introduction switching means is held at the re-introduction position and the document is introduced from the document delivery passage into the re-introduction passage, thus the surface and back of the document are reversed and the document is re-introduced into the transparent plate, the re-introduced document is reversedly conveyed by the reverse rotation of the document conveying means to allow the leading end of the document to abut against the document placing position restricting member, the operation control means, when the normal document positioning method is performed, applies a brake of a relatively small amount to the document conveying means after the reversely conveying drive of the document conveying means is stopped, and in the reversal document positioning method, the said control means applies a brake of a relatively large amount to the document conveying means after the reversely conveying drive of the document conveying means is stopped.

8. The automatic document conveying device of claim 7 in which the document conveying means is rotated by a reversible dc electric motor of the type in which by application of a normally rotating voltage, a normally rotating energy is produced, and by application of a reversedly rotating voltage, a reversedly rotating energy is produced in the document conveying means, and by grounding both connecting terminals of the motor, a braking action is produced, and, in the normal document positioning method, by grounding the two connecting terminals of the motor after the application of a reversedly rotating voltage to the motor is stopped, a brake is applied to the document conveying means, and in the reversal document positioning method, a brake is applied to the document conveying means by application of the normally rotating voltage to the motor after the stopping of applying a reversedly rotating voltage to the motor.

9. The automatic document conveying device of claim 8 in which in the reversal document positioning method, prior to applying a normally rotating voltage to the motor after the stopping of applying a reversedly rotating voltage to the motor, the two connecting terminals are grounded to apply a brake to the document conveying means.

10. The automatic document conveying device of claim 9 in which in the reversal document positioning method, after the application of a normally rotating voltage to the motor to apply a brake to the document conveying means, the two connecting terminals of the motor are grounded to apply a brake to the document conveying means.

11. The automatic document conveying device of claim 7 in which a movable frame member is mounted movably between a closed position which covers the transparent plate and an open position at which the transparent plate is exposed to view, the document conveying means is mounted on the movable frame member, and when the movable frame member is held at the closed position, the said means can move a document along the transparent plate, and the document conveying means is comprised of driven belt rollers and follower belt rollers disposed at a spaced-apart relationship in the conveying direction, and an endless belt wrapped about said driven belt rollers and follower belt rollers.

12. The automatic document conveying device of claim 11 wherein the document receiving tray includes a first document receiving tray and a second document receiving tray, the document delivery passage comprises a common passage extending from the other end edge of the transparent plate, a first branched passage extending from the downstream end of the common passage to the first document receiving tray, and a second branched passage extending from the downstream end of the common passage to the second document receiving tray, the branching passage switching means is disposed to be selectively held at a first branching position at which the common passage in the document delivery passage is allowed to communicate with the first branched passage and a second branching position at which the common passage is allowed to communicate with the second branched passage, the operation control means selectively performs a simple mode, a reversal mode and a double reversal mode;

in the simple mode, the document on the document table is introduced into the transparent plate through the document introduction passage, and positioned at a required position on the transparent plate, thereafter the branched passage switching means is held at the first branching position and the discharging re-introduction switching means is held at the discharging position, and the document is moved through the common passage and the first branched passage in the document delivery passage, thus the surface and back of the document are reversed and the document is discharged into the first document receiving tray;

in the reversing mode, the document on the document table is introduced onto the transparent plate through the document introduction passage and held at a required position on the transparent plate, and thereafter, the branched passage switching means is held at the first branching position, the discharging re-introduction switching means is held at the re-introduction position, the document is advanced from the common passage into the first branched passage, introduced into the re-introduction passage and re-introduced into the transparent plate, and thus the surface and back of the document is reversed and the document is again held at a required position on the transparent plate, and then the branched passage switching means is held at the second branching position, the document on the transparent plate is moved through the common passage and the second branched passage in the document delivery passage, thus the document is discharged onto the second document receiving tray without reversing;

and in the double reversing mode, the branched passage switching means is held at the first branching position and the discharging re-introduction means is held at the re-introduction passage, and the document conveyed from the table onto the transparent plate through the document introduction passage is advanced into the first branched passage from the common passage in the document delivery passage, and then introduced into the re-introduction passage and re-introduced onto the transparent plate, and thus, the surface and back of the document are reversed and the document is again positioned at a required position on the transparent plate, and thereafter the document is advanced into the first branched passage from the common passage in the document delivery passage, then introduced the re-introduction passage, re-introduced on the transparent plate, and thus the surface and back of the document is again reversed and the document is again positioned at a required position on the transparent plate, and thereafter the discharging re-introduction switching means is changed to the discharging position, and the document on the transparent plate is moved through the common passage and the first branched passage, whereby the surface and back of the document are reversed, and the document is discharged into the first document receiving tray.

13. The automatic document conveying device of claim 12 wherein the first document receiving tray is disposed on the upper surface of the movable frame member, and the second tray is disposed as isolated in the downstream direction from the other end edge of the transparent plate.

14. An automatic document conveying device to be applied to an image-processing machine with a transparent plate being disposed on the upper surface of a housing, the transparent plate adapted to receive a document to be processed, said device comprising a document table disposed as isolated in the upstream direction from one end edge of the transparent plate, a document introduction passage being defined by an upper restricting plate and a lower restricting plate and extending from the document table to the one end edge of the transparent plate, a document sending means for delivering a plurality of documents placed on the document table piece by piece through the document introduction passage, a document introduction means for introducing the document delivered into the document introduction passage onto the transparent plate, and a plurality of detectors for detecting documents introduced onto the transparent plate through the document introduction passage; wherein the plurality of detectors are mounted on a common circuit board, the circuit board is attached to the upper surface of the upper restricting plate or to the lower surface of the lower restricting plate, and openings corresponding to the plurality of detectors are formed on the upper restricting plate or the lower restricting plate, and in the upper restricting plate or the lower restricting plate, supporting projecting pieces for supporting one surface of the one end edge portion of the circuit board and screwing projecting pieces for screwing the other end edge portion of the circuit board are formed.

15. The automatic document conveying device of claim 14 in which the circuit board is mounted on the upper surface side of the upper restricting plate, and said upper restricting plate has a main portion extending along the document introduction passage and an additional portion extending upwardly from the upstream end of the main portion, the supporting projecting piece is formed by protruding a part of the addition position in the downstream direction, and by protruding a part of the downstream end portion of the main portion upwardly and then in upstream or downstream direction, the screwing projecting piece is formed.

16. The automatic document conveying device of claim 15 in which in the additional portion of the upper restricting plate, an upper supporting projecting piece and a lower supporting projecting piece which are displaced in the vertical direction with each other by sizes corresponding to the thickness of the circuit board are formed, the upstream end portion of the circuit board is held between the upper supporting projecting piece and the lower supporting projecting piece, and the under surfaces of the downstream end portions of the circuit board are positioned on the upper surface of the screwing projecting piece and secured by the screw.

* * * * *